(12) United States Patent
Jarvis et al.

(10) Patent No.: US 11,124,401 B1
(45) Date of Patent: Sep. 21, 2021

(54) AUTOMATED LOADING OF DELIVERY VEHICLES

(71) Applicant: Staples, Inc., Framingham, MA (US)

(72) Inventors: Daniel Jarvis, Windermere, FL (US); Paolo Gerli Amador, Westborough, MA (US); Michael Bhaskaran, Sherborn, MA (US); Amit Kalra, Acton, MA (US)

(73) Assignee: Staples, Inc., Framingham, MA (US)

( * ) Notice: Subject to any disclaimer, the term of this patent is extended or adjusted under 35 U.S.C. 154(b) by 216 days.

(21) Appl. No.: 16/371,104

(22) Filed: Mar. 31, 2019

(51) Int. Cl.
| | |
|---|---|
| *B66F 9/06* | (2006.01) |
| *G05D 1/02* | (2020.01) |
| *B65G 1/137* | (2006.01) |
| *G05D 1/00* | (2006.01) |

(52) U.S. Cl.
CPC ............ *B66F 9/063* (2013.01); *B65G 1/1373* (2013.01); *G05D 1/0088* (2013.01); *G05D 1/0225* (2013.01); *G05D 1/0297* (2013.01); *G05D 2201/0216* (2013.01)

(58) Field of Classification Search
CPC .... B66F 9/063; G05D 1/0225; G05D 1/0297; G05D 1/0088; G05D 2201/0216; B65G 1/1373
See application file for complete search history.

(56) References Cited

U.S. PATENT DOCUMENTS

| | | |
|---|---|---|
| 3,450,276 A | 6/1969 | Ferrari |
| 3,474,877 A | 10/1969 | Wesener |
| 3,628,624 A | 12/1971 | Wesener |
| 3,970,840 A | 7/1976 | De Bruine |
| 4,010,409 A | 3/1977 | Waites |
| 4,215,759 A | 8/1980 | Diaz |
| 4,258,813 A | 3/1981 | Rubel |

(Continued)

FOREIGN PATENT DOCUMENTS

| | | |
|---|---|---|
| CA | 1196712 A | 11/1985 |
| CA | 1210367 A | 8/1986 |

(Continued)

OTHER PUBLICATIONS

US 7,460,017 B2, 12/2008, Roeder et al. (withdrawn)

(Continued)

*Primary Examiner* — Peter D Nolan
*Assistant Examiner* — Ashley L Redhead, Jr.
(74) *Attorney, Agent, or Firm* — VLP Law Group LLP

(57) ABSTRACT

A system and method for automated loading of delivery vehicles using automated guided vehicles ("AGV"s) is described. In an example implementation, a loading coordination engine may assign a location on a mobile cart to an item and generate a task list including instructions to a first and a second AGV to position the item on the mobile cart based on the assigned location and to transport the mobile cart into a delivery vehicle. The first AGV may transport the item from an item loading area to a point proximate to the assigned location on the mobile cart and place the item at the assigned location based on the task list. The second AGV may transport the mobile cart from a cart loading zone into the delivery vehicle based on the task list and, in some instances, secure the mobile cart to the delivery vehicle based on the task list.

25 Claims, 13 Drawing Sheets

(56) References Cited

U.S. PATENT DOCUMENTS

| | | |
|---|---|---|
| 4,278,142 A | 7/1981 | Kono |
| 4,465,155 A | 8/1984 | Collins |
| 4,496,274 A | 1/1985 | Pipes |
| 4,524,314 A | 6/1985 | Walker |
| 4,530,056 A | 7/1985 | MacKinnon et al. |
| 4,556,940 A | 12/1985 | Katoo et al. |
| 4,562,635 A | 1/1986 | Carter |
| 4,566,032 A | 1/1986 | Hirooka et al. |
| 4,593,238 A | 6/1986 | Yamamoto |
| 4,593,239 A | 6/1986 | Yamamoto |
| 4,652,803 A | 3/1987 | Kamejima et al. |
| 4,653,002 A | 3/1987 | Barry |
| 4,657,463 A | 4/1987 | Pipes |
| 4,678,390 A | 7/1987 | Bonneton et al. |
| 4,700,302 A | 10/1987 | Arakawa et al. |
| 4,711,316 A | 12/1987 | Katou et al. |
| 4,714,399 A | 12/1987 | Olson |
| 4,716,530 A | 12/1987 | Ogawa et al. |
| 4,727,492 A | 2/1988 | Reeve et al. |
| 4,742,283 A | 5/1988 | Bolger et al. |
| 4,751,983 A | 6/1988 | Leskovec et al. |
| 4,764,078 A | 8/1988 | Neri |
| 4,772,832 A | 9/1988 | Okazaki et al. |
| 4,773,018 A | 9/1988 | Lundstrom |
| 4,777,601 A | 10/1988 | Boegli |
| 4,780,817 A | 10/1988 | Lofgren |
| 4,790,402 A | 12/1988 | Field et al. |
| 4,802,096 A | 1/1989 | Hainsworth et al. |
| 4,811,227 A | 3/1989 | Wikstrom |
| 4,811,229 A | 3/1989 | Wilson |
| 4,817,000 A | 3/1989 | Eberhardt |
| 4,846,297 A | 7/1989 | Field et al. |
| 4,847,769 A | 7/1989 | Reeve |
| 4,847,773 A | 7/1989 | van Helsdingen et al. |
| 4,847,774 A | 7/1989 | Tomikawa et al. |
| 4,852,677 A | 8/1989 | Okazaki |
| 4,857,912 A | 8/1989 | Everett, Jr. et al. |
| 4,858,132 A | 8/1989 | Holmquist |
| 4,862,047 A | 8/1989 | Suzuki et al. |
| 4,863,335 A | 9/1989 | Herigstad et al. |
| 4,875,172 A | 10/1989 | Kanayama |
| 4,890,233 A | 12/1989 | Ando et al. |
| 4,894,908 A * | 1/1990 | Haba, Jr. ............... B23P 21/004 29/711 |
| 4,918,607 A | 4/1990 | Wible |
| 4,924,153 A | 5/1990 | Toru et al. |
| 4,926,544 A | 5/1990 | Koyanagi et al. |
| 4,935,871 A | 6/1990 | Grohsmeyer |
| 4,939,650 A | 7/1990 | Nishikawa |
| 4,939,651 A | 7/1990 | Onishi |
| 4,942,531 A | 7/1990 | Hainsworth et al. |
| 4,947,324 A | 8/1990 | Kamimura et al. |
| 4,950,118 A | 8/1990 | Mueller et al. |
| 4,954,962 A | 9/1990 | Evans, Jr. et al. |
| 4,982,329 A | 1/1991 | Tabata et al. |
| 4,990,841 A | 2/1991 | Elder |
| 4,993,507 A | 2/1991 | Ohkura |
| 4,994,970 A | 2/1991 | Noji et al. |
| 4,996,468 A | 2/1991 | Field |
| 5,000,279 A | 3/1991 | Kondo et al. |
| 5,002,145 A | 3/1991 | Wakaumi et al. |
| 5,005,128 A | 4/1991 | Robins et al. |
| 5,006,988 A | 4/1991 | Borenstein et al. |
| 5,020,620 A | 6/1991 | Field |
| 5,023,790 A | 6/1991 | Luke, Jr. |
| 5,040,116 A | 8/1991 | Evans, Jr. et al. |
| 5,052,882 A | 10/1991 | Blau et al. |
| 5,053,969 A | 10/1991 | Booth |
| 5,073,749 A | 12/1991 | Kanayama |
| 5,109,940 A | 5/1992 | Yardley |
| 5,111,401 A | 5/1992 | Everett, Jr. et al. |
| 5,125,783 A | 6/1992 | Kawasoe et al. |
| 5,134,353 A | 7/1992 | Kita et al. |
| 5,138,560 A | 8/1992 | Lanfer et al. |
| 5,154,249 A | 10/1992 | Yardley |
| 5,164,648 A | 11/1992 | Kita et al. |
| 5,170,351 A | 12/1992 | Nemoto et al. |
| 5,170,352 A | 12/1992 | McTamaney et al. |
| 5,179,329 A | 1/1993 | Nishikawa et al. |
| 5,187,664 A | 2/1993 | Yardley et al. |
| 5,191,528 A | 3/1993 | Yardley et al. |
| 5,192,903 A | 3/1993 | Kita et al. |
| 5,199,524 A | 4/1993 | Ivancic |
| 5,202,832 A | 4/1993 | Lisy |
| 5,211,523 A | 5/1993 | Andrada Galan et al. |
| 5,216,605 A | 6/1993 | Yardley et al. |
| 5,239,249 A | 8/1993 | Ono |
| 5,249,157 A | 9/1993 | Taylor |
| 5,281,901 A | 1/1994 | Yardley et al. |
| 5,305,217 A | 4/1994 | Nakamura et al. |
| 5,341,130 A | 8/1994 | Yardley et al. |
| 5,387,853 A | 2/1995 | Ono |
| 5,488,277 A | 1/1996 | Nishikawa et al. |
| 5,510,984 A | 4/1996 | Markin et al. |
| 5,525,884 A | 6/1996 | Sugiura et al. |
| 5,545,960 A | 8/1996 | Ishikawa |
| 5,548,512 A | 8/1996 | Quraishi |
| 5,564,890 A | 10/1996 | Knudsen, Jr. |
| 5,568,030 A | 10/1996 | Nishikawa et al. |
| 5,650,703 A | 7/1997 | Yardley et al. |
| 5,669,748 A | 9/1997 | Knudsen, Jr. |
| 5,875,408 A | 2/1999 | Bendett et al. |
| 5,911,767 A | 6/1999 | Garibotto et al. |
| 5,923,270 A | 7/1999 | Sampo et al. |
| 5,961,559 A | 10/1999 | Shimbara et al. |
| 6,049,745 A | 4/2000 | Douglas et al. |
| 6,058,339 A | 5/2000 | Takiguchi et al. |
| 6,092,010 A | 7/2000 | Alofs et al. |
| 6,246,930 B1 | 6/2001 | Hori |
| 6,256,560 B1 | 7/2001 | Kim et al. |
| 6,345,217 B1 | 2/2002 | Zeitler et al. |
| 6,370,452 B1 | 4/2002 | Pfister |
| 6,377,888 B1 | 4/2002 | Olch |
| 6,422,152 B1 | 7/2002 | Rowe |
| 6,459,966 B2 | 10/2002 | Nakano et al. |
| 6,477,463 B2 | 11/2002 | Hamilton |
| 6,493,614 B1 | 12/2002 | Jung |
| 6,602,037 B2 | 8/2003 | Winkler |
| 6,615,108 B1 | 9/2003 | Peless et al. |
| 6,629,028 B2 | 9/2003 | Paromtchik et al. |
| 6,654,647 B1 | 11/2003 | Kal |
| 6,721,638 B2 | 4/2004 | Zeitler |
| 6,748,292 B2 | 6/2004 | Mountz |
| 6,772,062 B2 | 8/2004 | Lasky et al. |
| 6,882,910 B2 | 4/2005 | Jeong |
| 6,885,912 B2 | 4/2005 | Peless et al. |
| 6,895,301 B2 | 5/2005 | Mountz |
| 6,904,343 B2 | 6/2005 | Kang |
| 6,950,722 B2 | 9/2005 | Mountz |
| 6,971,464 B2 | 12/2005 | Marino et al. |
| 7,050,891 B2 | 5/2006 | Chen |
| 7,110,855 B2 | 9/2006 | Leishman |
| 7,155,309 B2 | 12/2006 | Peless et al. |
| 7,305,287 B2 | 12/2007 | Park |
| 7,333,631 B2 | 2/2008 | Roh et al. |
| 7,349,759 B2 | 3/2008 | Peless et al. |
| 7,402,018 B2 | 7/2008 | Mountz et al. |
| 7,403,120 B2 | 7/2008 | Duron et al. |
| 7,437,226 B2 | 10/2008 | Roh et al. |
| 7,460,016 B2 | 12/2008 | Sorenson, Jr. et al. |
| 7,505,849 B2 | 3/2009 | Saarikivi |
| 7,548,166 B2 | 6/2009 | Roeder et al. |
| 7,557,714 B2 | 7/2009 | Roeder et al. |
| 7,609,175 B2 | 10/2009 | Porte et al. |
| 7,613,617 B2 | 11/2009 | Williams et al. |
| 7,616,127 B2 | 11/2009 | Sorenson, Jr. et al. |
| 7,634,332 B2 | 12/2009 | Williams et al. |
| 7,639,142 B2 | 12/2009 | Roeder et al. |
| 7,648,329 B2 | 1/2010 | Chilson et al. |
| 7,656,296 B2 | 2/2010 | Runyon et al. |
| 7,681,796 B2 | 3/2010 | Cato et al. |
| 7,689,001 B2 | 3/2010 | Kim et al. |
| 7,693,757 B2 | 4/2010 | Zimmerman |
| 7,765,027 B2 | 7/2010 | Hong et al. |

(56) References Cited

U.S. PATENT DOCUMENTS

| | | |
|---|---|---|
| 7,826,919 B2 | 11/2010 | DAndrea et al. |
| 7,835,821 B2 | 11/2010 | Roh et al. |
| 7,840,328 B2 | 11/2010 | Baginski et al. |
| 7,845,560 B2 | 12/2010 | Emanuel et al. |
| 7,850,413 B2 | 12/2010 | Fontana |
| 7,873,469 B2 | 1/2011 | DAndrea et al. |
| 7,890,228 B2 | 2/2011 | Redmann, Jr. et al. |
| 7,894,932 B2 | 2/2011 | Mountz et al. |
| 7,894,933 B2 | 2/2011 | Mountz et al. |
| 7,894,939 B2 | 2/2011 | Zini et al. |
| 7,894,951 B2 | 2/2011 | Norris et al. |
| 7,912,574 B2 | 3/2011 | Wurman et al. |
| 7,912,633 B1 | 3/2011 | Dietsch et al. |
| 7,920,962 B2 | 4/2011 | DAndrea et al. |
| 7,925,514 B2 | 4/2011 | Williams et al. |
| 7,953,551 B2 | 5/2011 | Park et al. |
| 7,980,808 B2 | 7/2011 | Chilson et al. |
| 7,991,521 B2 | 8/2011 | Stewart |
| 7,996,109 B2 | 8/2011 | Zini et al. |
| 8,010,230 B2 | 8/2011 | Zini et al. |
| 8,020,657 B2 | 9/2011 | Allard et al. |
| 8,031,086 B2 | 10/2011 | Thacher et al. |
| 8,068,978 B2 | 11/2011 | DAndrea et al. |
| 8,072,309 B2 | 12/2011 | Kraimer et al. |
| 8,075,243 B2 | 12/2011 | Chilson et al. |
| 8,146,702 B2 | 4/2012 | Schendel et al. |
| 8,160,728 B2 | 4/2012 | Curtis |
| 8,170,711 B2 | 5/2012 | DAndrea et al. |
| 8,192,137 B2 | 6/2012 | Ross et al. |
| 8,193,903 B2 | 6/2012 | Kraimer et al. |
| 8,196,835 B2 | 6/2012 | Emanuel et al. |
| 8,200,423 B2 | 6/2012 | Dietsch et al. |
| 8,204,624 B2 | 6/2012 | Zini et al. |
| 8,210,791 B2 | 7/2012 | Chilson et al. |
| 8,220,710 B2 | 7/2012 | Hoffman et al. |
| 8,229,619 B2 | 7/2012 | Roh et al. |
| 8,239,291 B2 | 8/2012 | Hoffman et al. |
| 8,265,873 B2 | 9/2012 | DAndrea et al. |
| 8,269,643 B2 | 9/2012 | Chou |
| 8,271,132 B2 | 9/2012 | Nielsen et al. |
| 8,280,546 B2 | 10/2012 | DAndrea et al. |
| 8,280,547 B2 | 10/2012 | DAndrea et al. |
| 8,311,902 B2 | 11/2012 | Mountz et al. |
| 8,369,981 B2 | 2/2013 | Dunsker et al. |
| 8,381,982 B2 | 2/2013 | Kunzig et al. |
| 8,406,949 B2 | 3/2013 | Kondo |
| 8,412,400 B2 | 4/2013 | DAndrea et al. |
| 8,417,444 B2 | 4/2013 | Smid et al. |
| 8,418,919 B1 | 4/2013 | Beyda |
| 8,433,442 B2 | 4/2013 | Friedman et al. |
| 8,433,469 B2 | 4/2013 | Harvey et al. |
| 8,444,369 B2 | 5/2013 | Watt et al. |
| 8,452,464 B2 | 5/2013 | Castaneda et al. |
| 8,457,978 B2 | 6/2013 | Williams et al. |
| 8,473,140 B2 | 6/2013 | Norris et al. |
| 8,483,869 B2 | 7/2013 | Wurman et al. |
| 8,498,734 B2 | 7/2013 | Dunsker et al. |
| 8,515,612 B2 | 8/2013 | Tanaka et al. |
| 8,538,692 B2 | 9/2013 | Wurman et al. |
| 8,571,781 B2 | 10/2013 | Bernstein et al. |
| 8,577,551 B2 | 11/2013 | Siefring et al. |
| 8,587,455 B2 | 11/2013 | Porte et al. |
| 8,594,834 B1 * | 11/2013 | Clark .................. G06Q 10/087 700/214 |
| 8,606,392 B2 | 12/2013 | Wurman et al. |
| 8,626,332 B2 | 1/2014 | Dunsker et al. |
| 8,626,335 B2 | 1/2014 | Wurman et al. |
| 8,639,382 B1 | 1/2014 | Clark et al. |
| 8,649,899 B2 | 2/2014 | Wurman et al. |
| 8,653,945 B2 | 2/2014 | Baek et al. |
| 8,670,892 B2 | 3/2014 | Yang |
| 8,676,426 B1 | 3/2014 | Murphy |
| 8,700,502 B2 | 4/2014 | Mountz et al. |
| 8,718,814 B1 | 5/2014 | Clark et al. |
| 8,725,286 B2 | 5/2014 | DAndrea et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,751,063 B2 | 6/2014 | Bernstein et al. |
| 8,751,147 B2 | 6/2014 | Colwell |
| 8,755,936 B2 | 6/2014 | Friedman et al. |
| 8,760,276 B2 | 6/2014 | Yamazato |
| 8,761,989 B1 | 6/2014 | Murphy |
| 8,788,121 B2 | 7/2014 | Klinger |
| 8,798,784 B1 | 8/2014 | Clark et al. |
| 8,798,786 B2 | 8/2014 | Wurman et al. |
| 8,798,840 B2 | 8/2014 | Fong et al. |
| 8,805,573 B2 | 8/2014 | Brunner et al. |
| 8,805,574 B2 | 8/2014 | Stevens et al. |
| 8,825,257 B2 | 9/2014 | Ozaki et al. |
| 8,831,984 B2 | 9/2014 | Hoffman et al. |
| 8,862,397 B2 | 10/2014 | Tsujimoto et al. |
| 8,874,300 B2 | 10/2014 | Allard et al. |
| 8,874,360 B2 | 10/2014 | Klinger et al. |
| 8,880,416 B2 | 11/2014 | Williams et al. |
| 8,886,385 B2 | 11/2014 | Takahashi et al. |
| 8,892,240 B1 | 11/2014 | Vliet et al. |
| 8,892,241 B2 | 11/2014 | Weiss |
| 8,909,368 B2 | 12/2014 | DAndrea et al. |
| 8,930,133 B2 | 1/2015 | Wurman et al. |
| 8,948,956 B2 | 2/2015 | Takahashi et al. |
| 8,954,188 B2 | 2/2015 | Sullivan et al. |
| 8,965,561 B2 | 2/2015 | Jacobus et al. |
| 8,965,562 B1 | 2/2015 | Wurman et al. |
| 8,965,578 B2 | 2/2015 | Versteeg et al. |
| 8,970,363 B2 | 3/2015 | Kraimer et al. |
| 8,972,045 B1 | 3/2015 | Mountz et al. |
| 8,983,647 B1 | 3/2015 | Dwarakanath et al. |
| 8,988,285 B2 | 3/2015 | Smid et al. |
| 8,989,918 B2 | 3/2015 | Sturm |
| 9,002,506 B1 | 4/2015 | Agarwal et al. |
| 9,002,581 B2 | 4/2015 | Castaneda et al. |
| 9,008,827 B1 | 4/2015 | Dwarakanath et al. |
| 9,008,828 B2 * | 4/2015 | Worsley ............. G05B 19/4189 700/216 |
| 9,008,829 B2 | 4/2015 | Worsley |
| 9,008,830 B2 | 4/2015 | Worsley |
| 9,009,072 B2 | 4/2015 | Mountz et al. |
| 9,014,902 B1 | 4/2015 | Murphy |
| 9,020,679 B2 | 4/2015 | Zini et al. |
| 9,026,301 B2 | 5/2015 | Zini et al. |
| 9,043,016 B2 | 5/2015 | Filippov et al. |
| 9,046,893 B2 | 6/2015 | Douglas et al. |
| 9,052,714 B2 | 6/2015 | Creasey et al. |
| 9,056,719 B2 | 6/2015 | Tanahashi |
| 9,067,317 B1 | 6/2015 | Wurman et al. |
| 9,073,736 B1 | 7/2015 | Hussain et al. |
| 9,082,293 B2 | 7/2015 | Wellman et al. |
| 9,087,314 B2 | 7/2015 | Hoffman et al. |
| 9,090,214 B2 | 7/2015 | Bernstein et al. |
| 9,090,400 B2 | 7/2015 | Wurman et al. |
| 9,098,080 B2 | 8/2015 | Norris et al. |
| 9,110,464 B2 | 8/2015 | Holland et al. |
| 9,111,251 B1 | 8/2015 | Brazeau |
| 9,114,838 B2 | 8/2015 | Bernstein et al. |
| 9,120,621 B1 | 9/2015 | Curlander et al. |
| 9,120,622 B1 | 9/2015 | Elazary et al. |
| 9,122,276 B2 | 9/2015 | Kraimer et al. |
| 9,129,250 B1 | 9/2015 | Sestini et al. |
| 9,134,734 B2 | 9/2015 | Lipkowski et al. |
| 9,146,559 B2 | 9/2015 | Kuss et al. |
| 9,147,173 B2 | 9/2015 | Jones et al. |
| 9,150,263 B2 | 10/2015 | Bernstein et al. |
| 9,152,149 B1 | 10/2015 | Palamarchuk et al. |
| 9,185,998 B1 | 11/2015 | Dwarakanath et al. |
| 9,188,982 B2 | 11/2015 | Thomson |
| 9,193,404 B2 | 11/2015 | Bernstein et al. |
| 9,202,382 B2 | 12/2015 | Klinger et al. |
| 9,206,023 B2 | 12/2015 | Wong et al. |
| 9,207,673 B2 | 12/2015 | Pulskamp et al. |
| 9,207,676 B2 | 12/2015 | Wu et al. |
| 9,211,920 B1 | 12/2015 | Bernstein et al. |
| 9,213,934 B1 | 12/2015 | Versteeg et al. |

(56) References Cited

U.S. PATENT DOCUMENTS

| | | |
|---|---|---|
| 9,216,745 B2 | 12/2015 | Beardsley et al. |
| 9,218,003 B2 | 12/2015 | Fong et al. |
| 9,218,316 B2 | 12/2015 | Bernstein et al. |
| 9,242,799 B1 | 1/2016 | OBrien et al. |
| 9,244,463 B2 | 1/2016 | Pfaff et al. |
| 9,248,973 B1 | 2/2016 | Brazeau |
| 9,260,244 B1 | 2/2016 | Cohn |
| 9,266,236 B2 | 2/2016 | Clark et al. |
| 9,268,334 B1 | 2/2016 | Vavrick |
| 9,274,526 B2 | 3/2016 | Murai et al. |
| 9,280,153 B1 | 3/2016 | Palamarchuk et al. |
| 9,280,157 B2 | 3/2016 | Wurman et al. |
| 9,290,220 B2 | 3/2016 | Bernstein et al. |
| 9,304,001 B2 | 4/2016 | Park et al. |
| 9,310,802 B1 | 4/2016 | Elkins et al. |
| 9,317,034 B2 | 4/2016 | Hoffman et al. |
| 9,329,078 B1 | 5/2016 | Mundhenke et al. |
| 9,329,599 B1 | 5/2016 | Sun et al. |
| 9,330,373 B2 | 5/2016 | Mountz et al. |
| 9,341,720 B2 | 5/2016 | Garin et al. |
| 9,342,811 B2 | 5/2016 | Mountz et al. |
| 9,346,619 B1 | 5/2016 | OBrien et al. |
| 9,346,620 B2 | 5/2016 | Brunner et al. |
| 9,352,745 B1 | 5/2016 | Theobald |
| 9,355,065 B2 | 5/2016 | Donahue |
| 9,365,348 B1 | 6/2016 | Agarwal et al. |
| 9,367,827 B1 | 6/2016 | Lively et al. |
| 9,367,831 B1 | 6/2016 | Besehanic |
| 9,371,184 B1 | 6/2016 | Dingle et al. |
| 9,378,482 B1 | 6/2016 | Pikler et al. |
| 9,389,609 B1 | 7/2016 | Mountz et al. |
| 9,389,612 B2 | 7/2016 | Bernstein et al. |
| 9,389,614 B2 | 7/2016 | Shani |
| 9,394,016 B2 | 7/2016 | Bernstein et al. |
| 9,395,725 B2 | 7/2016 | Bernstein et al. |
| 9,404,756 B2 | 8/2016 | Fong et al. |
| 9,405,016 B2 | 8/2016 | Yim |
| 9,427,874 B1 | 8/2016 | Rublee |
| 9,429,940 B2 | 8/2016 | Bernstein et al. |
| 9,429,944 B2 | 8/2016 | Filippov et al. |
| 9,436,184 B2 | 9/2016 | DAndrea et al. |
| 9,440,790 B2 | 9/2016 | Mountz et al. |
| 9,448,560 B2 | 9/2016 | DAndrea et al. |
| 9,451,020 B2 | 9/2016 | Liu et al. |
| 9,452,883 B1 | 9/2016 | Wurman et al. |
| 9,457,730 B2 | 10/2016 | Bernstein et al. |
| 11,004,033 B1 * | 5/2021 | Theobald ............ G05D 1/0027 |
| 2006/0245893 A1 | 11/2006 | Schottke |
| 2010/0234990 A1 | 9/2010 | Zini et al. |
| 2010/0300841 A1 | 12/2010 | OBrien |
| 2012/0321423 A1 | 12/2012 | MacKnight et al. |
| 2013/0058743 A1 | 3/2013 | Rebstock |
| 2013/0096735 A1 | 4/2013 | Byford et al. |
| 2013/0302132 A1 | 11/2013 | DAndrea |
| 2014/0124462 A1 | 5/2014 | Yamashita |
| 2014/0143061 A1 | 5/2014 | Abhyanker |
| 2014/0370167 A1 | 12/2014 | Garden |
| 2015/0073589 A1 | 3/2015 | Khodl et al. |
| 2015/0117995 A1 | 4/2015 | DAndrea |
| 2015/0307278 A1 | 10/2015 | Wickham et al. |
| 2016/0090248 A1 | 3/2016 | Worsley et al. |
| 2016/0176637 A1 | 6/2016 | Ackerman et al. |
| 2016/0203543 A1 | 7/2016 | Snow |
| 2016/0232477 A1 | 8/2016 | Cortes et al. |
| 2016/0347545 A1 | 12/2016 | Lindbo et al. |
| 2017/0043953 A1 | 2/2017 | Battles et al. |
| 2017/0174431 A1 | 6/2017 | Borders et al. |
| 2018/0072404 A1 | 3/2018 | Prager et al. |
| 2018/0088586 A1 | 3/2018 | Hance et al. |
| 2018/0089616 A1 | 3/2018 | Jacobus et al. |
| 2018/0155029 A1 | 6/2018 | Gil |
| 2018/0341904 A1 * | 11/2018 | Aleman ............ G06Q 10/083 |
| 2019/0143872 A1 | 5/2019 | Gil |
| 2020/0070717 A1 | 3/2020 | Garden et al. |
| 2020/0103882 A1 | 4/2020 | Sullivan et al. |
| 2021/0125146 A1 * | 4/2021 | Tazume ............ G05D 1/0011 |

FOREIGN PATENT DOCUMENTS

| | | |
|---|---|---|
| CA | 1228142 A | 10/1987 |
| CA | 1238103 A | 6/1988 |
| CA | 1264490 A | 1/1990 |
| CA | 1267866 A | 4/1990 |
| CA | 1269740 A | 5/1990 |
| CA | 1271544 A | 7/1990 |
| CA | 1275721 C | 10/1990 |
| CA | 1276264 C | 11/1990 |
| CA | 2029773 A1 | 5/1991 |
| CA | 1291725 C | 11/1991 |
| CA | 2036104 A1 | 11/1991 |
| CA | 2042133 A1 | 1/1992 |
| CA | 2049578 A1 | 2/1992 |
| CA | 2296837 A1 | 2/1992 |
| CA | 2094833 A1 | 4/1992 |
| CA | 1304043 C | 6/1992 |
| CA | 2095442 A1 | 6/1992 |
| CA | 1304820 C | 7/1992 |
| CA | 1323084 C | 10/1993 |
| CA | 2189853 A1 | 11/1995 |
| CA | 2244668 A1 | 3/1999 |
| CA | 2469652 A1 | 6/2003 |
| CA | 2514523 A1 | 8/2004 |
| CA | 2565553 A1 | 11/2005 |
| CA | 2577346 A1 | 4/2006 |
| CA | 2613180 A1 | 1/2007 |
| CA | 2921584 A1 | 1/2007 |
| CA | 2625885 A1 | 4/2007 |
| CA | 2625895 A1 | 4/2007 |
| CA | 2837477 A1 | 4/2007 |
| CA | 2864027 A1 | 4/2007 |
| CA | 2636233 A1 | 7/2007 |
| CA | 2640769 A1 | 8/2007 |
| CA | 2652114 A1 | 12/2007 |
| CA | 2654258 A1 | 12/2007 |
| CA | 2654260 A1 | 12/2007 |
| CA | 2654263 A1 | 12/2007 |
| CA | 2654295 A1 | 12/2007 |
| CA | 2654336 A1 | 12/2007 |
| CA | 2654471 A1 | 12/2007 |
| CA | 2748398 A1 | 12/2007 |
| CA | 2748407 A1 | 12/2007 |
| CA | 2750043 A1 | 12/2007 |
| CA | 2781624 A1 | 12/2007 |
| CA | 2781857 A1 | 12/2007 |
| CA | 2838044 A1 | 12/2007 |
| CA | 2866664 A1 | 12/2007 |
| CA | 2921134 A1 | 12/2007 |
| CA | 2663578 A1 | 4/2008 |
| CA | 2860745 A1 | 4/2008 |
| CA | 2671955 A1 | 7/2008 |
| CA | 2673025 A1 | 7/2008 |
| CA | 2674241 A1 | 7/2008 |
| CA | 2691710 A1 | 12/2008 |
| CA | 2721345 A1 | 10/2009 |
| CA | 2760127 A1 | 11/2009 |
| CA | 2760225 A1 | 11/2009 |
| CA | 2743706 A1 | 6/2010 |
| CA | 2754626 A1 | 9/2010 |
| CA | 2765565 A1 | 1/2011 |
| CA | 2932535 A1 | 1/2011 |
| CA | 2932537 A1 | 1/2011 |
| CA | 2770139 A1 | 2/2011 |
| CA | 2773963 A1 | 3/2011 |
| CA | 2778111 A1 | 5/2011 |
| CA | 2784874 A1 | 7/2011 |
| CA | 2868578 A1 | 7/2011 |
| CA | 2806852 A1 | 2/2012 |
| CA | 2823715 A1 | 7/2012 |
| CA | 2827281 A1 | 8/2012 |
| CA | 2827735 A1 | 8/2012 |
| CA | 2770715 A1 | 9/2012 |
| CA | 2770918 A1 | 9/2012 |

(56) References Cited

FOREIGN PATENT DOCUMENTS

| | | | |
|---|---|---|---|
| CA | 2831832 | A1 | 10/2012 |
| CA | 2836933 | A1 | 12/2012 |
| CA | 2851774 | A1 | 4/2013 |
| CA | 2799871 | A1 | 6/2013 |
| CA | 2866708 | A1 | 9/2013 |
| CA | 2938894 | A1 | 9/2013 |
| CA | 2813874 | A1 | 12/2013 |
| CA | 2824189 | A1 | 2/2014 |
| CA | 2870381 | A1 | 4/2014 |
| CA | 2935223 | A1 | 4/2014 |
| CA | 2894546 | A1 | 6/2014 |
| CA | 2845229 | A1 | 9/2014 |
| CA | 2899553 | A1 | 10/2014 |
| CA | 2882452 | A1 | 8/2015 |
| CA | 2886121 | A1 | 10/2015 |
| WO | 2012154872 | A2 | 11/2012 |
| WO | 2016015000 | A2 | 1/2016 |
| WO | WO-2016015000 A2 * | 1/2016 | .............. B60L 53/65 |

OTHER PUBLICATIONS

US 9,050,932 B2, 06/2015, Bernstein et al. (withdrawn)
US 9,342,073 B2, 05/2016, Bernstein et al. (withdrawn)
Warehouse Robots at Work, IEEE Spectrum,. Jul. 21, 2008, YouTube https://www.youtube.com/watch?v=IWsMdN7HMuA.
International Search Report and Written Opinion, PCT/US2017/054627, dated Jan. 5, 2018 (15 pages).
International Search Report and Written Opinion, PCT/US2018/012645, dated Mar. 7, 2018 (13 pages).
International Search Report and Written Opinion, PCT/US2018/012641, dated Mar. 7, 2018 (17 pages).

* cited by examiner

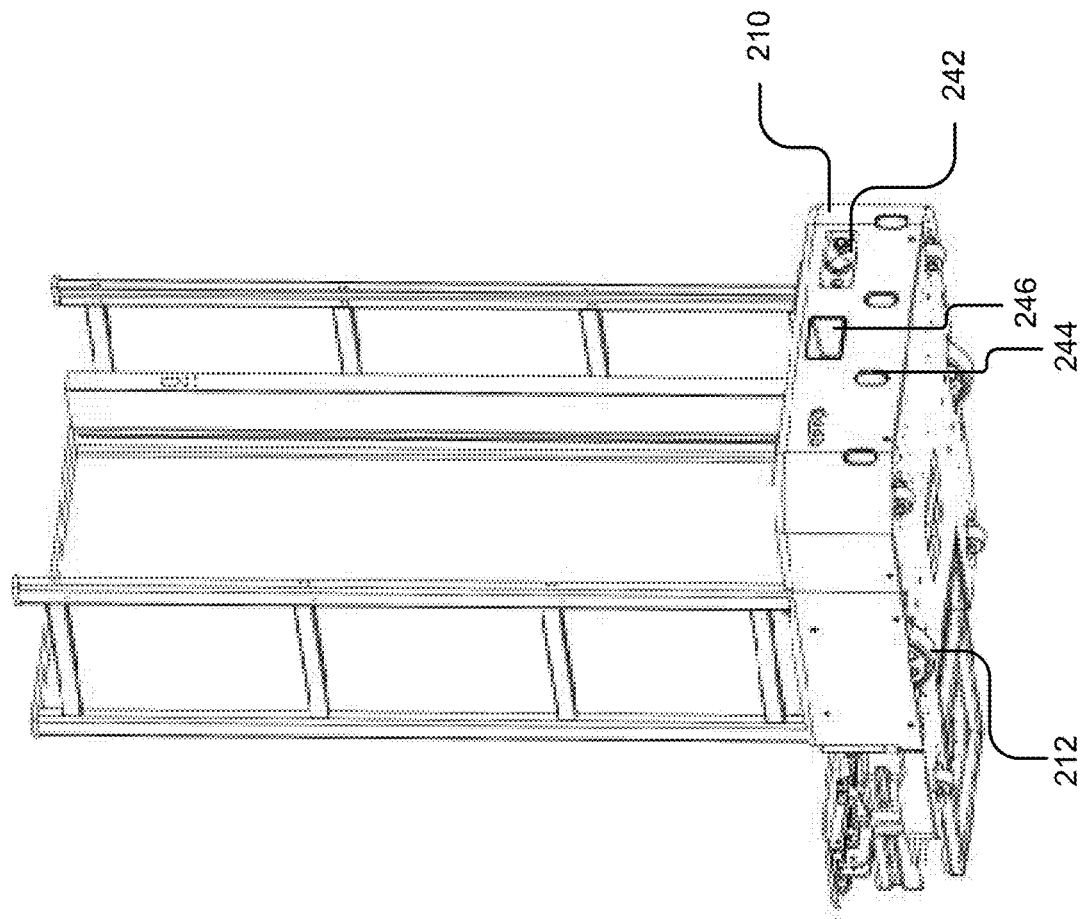

AUTOMATED LOADING OF DELIVERY VEHICLES

BACKGROUND

This application relates to automated preparation of delivery vehicles. For example and not limitation, this application relates to coordinating automated guided vehicles load items onto mobile carts and into delivery vehicles.

A delivery vehicle may receive, transport, and deliver tens, hundreds, or more orders containing numerous individual items, which may be loaded from fulfillment centers, warehouses, stores, or other facilities. Some current delivery loading systems use hand trucks or dollies, which are manually loaded with boxes or other items, pulled or pushed by a human into a delivery truck, and then manually unloaded onto shelves in the delivery truck. However, when performing such tasks, humans quickly become physically and mentally tired leading them to work inefficiently, commit errors, and require breaks or work at a slower pace. Further, these solutions require sufficient space within the delivery vehicle for a human to move around, carry items, and, potentially, drag a hand truck, which wastes space in the delivery vehicle.

Some delivery vehicle loading solutions use forklifts to move entire pallets of items, however these solutions are not practical when fulfilling many orders that include, for instance, only a few items while a pallet may include tens or hundreds of items. Additionally, traditional forklifts are not able to navigate within or adjacent to delivery vehicles, because traditional forklifts require substantial space to manipulate a pallet.

Further, tracking which items are loaded onto the delivery vehicle, in what order the items are loaded, or where the items are placed in the delivery vehicle is typically done with pen and paper or not done at all. These solutions require a human to decide how to load the items into the delivery vehicle (e.g., onto which shelves a particular item should be placed), manually load the items, and then update the checklist. However, humans may forget to update the checklist or may place items in a delivery vehicle in inefficient locations, thereby reducing storage and delivery efficiency.

Accordingly, improved delivery vehicle preparation solutions are desirable.

SUMMARY

The subject matter described in this disclosure overcomes at least the deficiencies and limitations described in the Background.

According to one innovative aspect of the subject matter described in this disclosure, the technology may include a first automated guided vehicle (AGV); a second AGV; a delivery vehicle; and a computing system including one or more processors and a memory storing instructions that, when executed by the one or more processors, cause the system to: assign a location on a mobile cart to an item; generate a task list including a first instruction to the first AGV to position the item on the mobile cart based on the assigned location and a second instruction to the second AGV to transport the mobile cart into the delivery vehicle; transport, by the first AGV, the item from an item loading area to a point proximate to the assigned location on the mobile cart; place, by the first AGV, the item at the assigned location based on the task list; transport, by the second AGV, the mobile cart from a cart loading zone into the delivery vehicle based on the task list; and secure the mobile cart to the delivery vehicle.

Implementations may include one or more of the following features. The system where the instructions further cause the system to generate a delivery task, assign the delivery vehicle to a door dock at a loading facility based on the delivery task, and transport the mobile cart from the delivery vehicle to the cart loading zone associated with the door dock using the second AGV, the cart loading zone being determined based on the assignment of the door dock. The system where the instructions further cause the system to receive a notification message indicating arrival of the delivery vehicle at the door dock, transmit an instruction to release a cart lock, the cart lock configured to secure the mobile cart to the delivery vehicle, couple the second AGV with the mobile cart, and transport the mobile cart from the delivery vehicle to the cart loading zone using the second AGV. The system where transporting, by the first AGV, the item from the item loading area to the point proximate to the assigned location on the mobile cart includes navigating the first AGV to the item loading area, retrieving the item from the item loading area by the first AGV, determining the point proximate to the assigned location on the mobile cart based on a location of the mobile cart, the assigned location, and a range of motion of an item handling mechanism of the first AGV, and navigating the first AGV to the point proximate to the assigned location on the mobile cart in the cart loading zone. The system where placing, by the first AGV, the item at the assigned location based on the task list includes articulating an item handling mechanism of the first AGV to a height matching a shelf of the mobile cart at which the assigned location is located, and transferring the item from the item handling mechanism to the shelf at the assigned location. The system where transporting, by the second AGV, the mobile cart from the cart loading zone into the delivery vehicle based on the task list includes navigating the second AGV to the cart loading zone, coupling the second AGV with the mobile cart in the cart loading zone, and navigating the second AGV with the mobile cart using a guidance system of the second AGV including applying motive force to the mobile cart by the second AGV to transport the mobile cart into the delivery vehicle. The system where securing the mobile cart to the delivery vehicle includes actuating a cart lock to secure the mobile cart to the delivery vehicle in response to the second AGV transporting the mobile cart to a designated location in the delivery vehicle. The system where the first AGV includes a first drive unit that provides motive force to the first AGV, a first guidance system that locates the first AGV in an operating environment, and an item handling mechanism adapted to move items. The system where the second AGV includes a second drive unit that provides motive force to the second AGV, a second guidance system that locates the second AGV in the operating environment, and a cart coupling mechanism that couples the second AGV with the mobile cart. The system where the instructions further cause the system to capture a label of the item using a scanner communicatively coupled with the computing system, determine a delivery destination based on the captured label on the item, and assign the item to the location on the mobile cart based on the delivery destination of the item. The system where the instructions further cause the system to assign the item to a door dock associated with the delivery vehicle based on a delivery destination of the item, and instruct a conveyor mechanism to transport the item to the door dock associated with the delivery vehicle. The system where assigning the item to the location on the mobile cart includes determining one or more measurements of the item, determining one or more measurements of available storage locations on the mobile cart, determining a position of a delivery of the item in a sequence of deliveries of a set of items assigned to the delivery vehicle, and determining the assigned location of the item based on the one or more measurements of the item, the one or more measurements of the available storage locations on the mobile cart, and the position of the delivery of the item in the sequence of deliveries.

In general, another innovative aspect may include one or more AGVs that may include: a body; a drive unit coupled with the body and providing motive force to the body; a guidance system coupled with a controller, the guidance system locating the one or more AGVs in an operating environment; an item handling mechanism coupled with the body and the controller, the item handling mechanism adapted to move an item; the controller coupled with the drive unit, the guidance system, and the item handling mechanism, the controller performing operations including: receiving an instruction from a computing system, the instruction identifying a location on a mobile cart in a cart loading zone, the location being assigned to the item; transporting, by the one or more AGVs, the item from an item loading area to a point proximate to the assigned location on the mobile cart, transporting including navigating using the drive unit and the guidance system; placing the item at the assigned location using the item handling mechanism of the one or more AGVs; and transporting, by the one or more AGVs, the mobile cart from the cart loading zone into a delivery vehicle based on the item being placed at the assigned location.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 2A-2D are illustrations of example automated guided vehicles for filling a mobile cart with items.

DESCRIPTION

Figure 1:
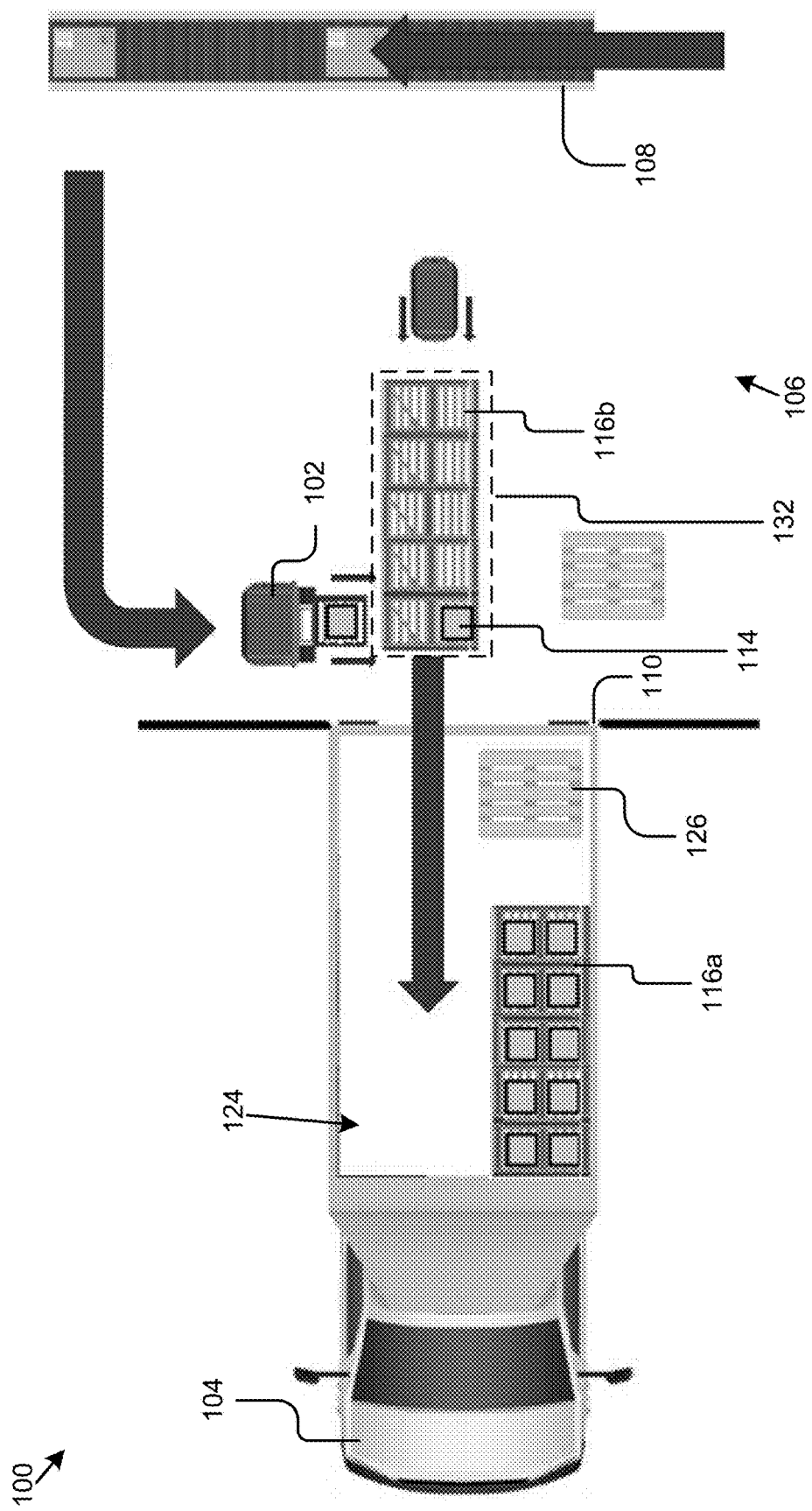
FIG. 1 is an illustration of an example delivery vehicle and automated guided vehicle loading layout.

Among other benefits, the technology described herein improves upon the technology described in the Background Section. For instance, the technology provides robotic devices, systems, methods, and other aspects that can more efficiently prepare mobile carts 116 and delivery vehicles 104. The technology may automate storage or retrieval of items in a delivery vehicle 104 using robotic technology to support delivery operations. For instance, the technology described herein describes example automated guided vehicles ("AGVs") 102 that efficiently carry items. An item may be a physical object, such as a product, box or container of products, etc. Some implementations of the technology described herein may include a system and method that includes determining locations on a mobile cart 116 and/or in delivery vehicle 104 and manipulating the items to place them in the determined locations on a mobile cart 116 by a first AGV 102 and then moving the mobile cart 116 into the delivery vehicle 104 by a second AGV 102.

Further, some implementations may include advancements to computing systems, computer logic, conveyor mechanisms 108, AGVs 102, delivery vehicles 104, scanners, guidance systems, mobile carts 116, and shelving systems for supporting the preparation of delivery vehicles 104 using the AGVs 102, as described in further detail elsewhere herein. Further, according to some implementations, hardware and computer logic aspects of the technology work together to execute tasks described herein and solve the problems discussed in the Background, for example.

The technologies described herein are beneficial over the previous solutions described in the Background at least because the algorithms and devices may automatically determine storage locations within a delivery vehicle 104 such that items may be efficiently loaded into the delivery vehicle 104. For instance, the operations and devices described herein may reduce the shuffling of items, distance moved by an AGV 102, time expended for retrieving the items during delivery, time expended loading items into the delivery vehicle 104, and/or space used by the items. For example, the systems and logic described herein may identify a list of locations for delivery, sort the items being delivered to the locations, and generate a task for a cart filling AGV 102a to place the items on a mobile cart 116 in an efficient manner. The systems and logic may generate a task for a cart loading AGV 102b to move the mobile cart 116 into the delivery vehicle 104, thereby accurately and automatically tracking items loaded into a delivery vehicle 104, optimizing space utilization, optimizing delivery efficiency, and decreasing physical and mental fatigue of human workers.

The technologies described herein may optimize the amount of space available in a delivery vehicle 104 by externally preparing a mobile cart 116 using a cart filling AGV(s) 102a and then, moving the mobile cart 116 into the delivery vehicle 104 using a cart loading AGV 102b, for example, because a cart may be too heavy for a human to move. The system may provide improvements in software intelligence to coordinate movements between different AGVs 102, for example. The technologies beneficially improve productivity, increase asset utilization, decrease physical and mental fatigue, and lower cycle time and labor costs. These benefits, in turn, lead to shorter delivery times and result in significant savings and value.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is an illustration of an example delivery vehicle 104 and automated guided vehicle loading environment 100. As illustrated, the example environment may include a loading bay 106 with a door dock 110 at which a delivery vehicle 104 may be parked, one or more AGVs 102a and 102b preparing a mobile cart 116 and the delivery vehicles 104 with items to be delivered (or, in some implementations, receiving items being delivered by the delivery vehicles 104), and, in some implementations, one or more conveyor mechanisms 108 configured to bring items to the loading bay 106. As discussed in further detail elsewhere herein, some or all of the components of the environment 100 may include communication devices and computer logic allowing coordination of the components in order to more effectively autonomously load the delivery vehicles 104, for example, as discussed in reference to FIG. 8 and the methods herein. It should be noted that the example environment 100 illustrated in FIG. 1 may be modified with additional or fewer components or a different layout without departing from the scope of this disclosure.

In some implementations, the loading environment 100 may include a cart loading zone 132 (e.g., in the loading bay 106) in which a mobile cart 116 may be loaded with items, for instance, mobile cart 116b is illustrated in an example cart loading zone 132. In some implementations, the cart loading zone 132 may be an area associated with a door dock 110 and to which a cart filling AGV 102a may transport items to place the items on a mobile cart 116 located in the cart loading zone 132. In some instances, the location of the cart loading zone 132 may be defined within the loading bay 106 relative to the door dock 110, conveyor 108, delivery vehicle 104, etc. For example, the location of a cart loading zone 132 and, in some instances, location of a mobile cart 116 may be defined in X/Y coordinates and/or as an offset from a location, such as a door dock 110. Accordingly, in some implementations, the loading coordination engine 804 may use the location of the cart loading zone 132 (and/or mobile cart 116) in combination with the assigned location of an item on the mobile cart 116 when determining a location at which to place an item on a mobile cart 116. For instance, the loading coordination engine 804 may use the location of the mobile cart 116 and/or cart loading zone 132 to navigate to a point adjacent to the assigned location for an item, as described in further detail in reference to FIG. 4.

In some implementations, a cart loading zone 132 may include space for a single mobile cart 116 or for multiple mobile carts 116. The location of the cart loading zone 132 may change depending on which mobile cart 116 is being loaded (e.g., a delivery vehicle 104 may be capable of carrying multiple mobile carts 116). Further, in some implementations, a cart loading zone 132 may be capable of serving or being associated with multiple door docks 110, conveyors 108, conveyor locations, etc., for example, by using time sharing among door docks 110 or by including space for multiple mobile carts 116. Similarly, a single door dock 110 may have multiple cart loading zones 132 associated therewith, for instance, so that multiple mobile carts 116 associated with a particular delivery vehicle 104 can be loaded simultaneously.

A delivery vehicle 104 may include a truck (e.g., a box truck), trailer (e.g., connected with a truck), van, autonomous vehicle, etc. The delivery vehicle 104 includes a storage area 124 in which mobile carts 116 loaded with items may be placed (e.g., using a cart loading AGV 102b, as discussed herein) for transportation to delivery destinations. As illustrated in FIG. 1, an item may include a carton 114, although it should be understood that an item may be any physical object.

The storage area 124 may include one or more doors, such as a side door, back door, front door (e.g., in a cab of the delivery vehicle 104) or even top door, which, in some instances, may be tied to defined operations. For example, a side door may be used for loading or deliveries at locations without loading/unloading docks (e.g., at a curbside), a back door may be used for loading or deliveries at locations with loading/unloading docks, a front door may load items directly into or adjacent to a cab of the delivery vehicle 104, and a top door may be used with an aerial drone to deliver items from the delivery vehicle 104. The delivery doors may be associated with delivery destinations and used by the loading coordination engine 804 to determine placement locations of the items on mobile carts 116 to be stored inside of the storage area 124 of the delivery vehicle 104. For instance, a cart filling AGV 102a may automatically place items on a mobile cart 116 based on the specific door that is used during delivery, as described in further detail in reference to FIG. 7.

The storage area 124 of the delivery vehicle 104 may include a cart lock mechanism adapted to impede certain movement of the mobile cart 116 within the delivery vehicle 104, for example, the cart lock mechanism may include rails, hooks, magnets, pins, etc. In some implementations, the cart lock mechanism may be mechanically or electronically lockable and/or releasable by an AGV 102 (e.g., a cart loading AGV 102b) or other computing device communicatively coupled with the loading coordination engine 804.

The storage area 124 of the delivery vehicle 104 may include one or more designated locations for one or more mobile carts 116, which may be adapted to hold multiple items. In some implementations, the mobile carts 116 may be arranged along one side of the storage area 124, for example, the mobile cart 116 may be on the left side of the storage area 124 to enable movement of an AGV 102 or delivery person along the right side. In some implementations, mobile carts 116 may be arranged along both the left and right side of the storage area 124.

A mobile cart 116 may include a storage device on which items may be placed, moved, and removed. The mobile cart 116 is configured to be transported between the cart loading zone 132 and the delivery vehicle 104, for example, by a cart loading AGV 102b. The mobile cart 116 may have wheels, a coupling point or mechanism (e.g., via which the cart loading AGV 102b may couple with the mobile cart 116), one or more shelves, one or more bins, and/or a cart lock or component thereof (e.g., via which the mobile cart 116 may be secured to the delivery vehicle 104).

For example, as illustrated in FIG. 1, an example mobile cart 116a is filled with items and loaded into the storage area 124 of the delivery vehicle 104. FIG. 1 also illustrates another example mobile cart 116b in the cart loading zone 132 being filled by a cart filling AGV 102a. In some implementations, once the cart filling AGV 102a has added the assigned items to the mobile cart 116b, the cart loading AGV 102b may transport the mobile cart 116b from the cart loading zone 132 into the delivery vehicle 104.

In some implementations, mobile cart 116, a shelf on a mobile cart 116, portion of a shelf, etc., may include a marker (not shown) identifying the mobile cart 116 and/or shelf. For instance, a section of a particular shelf may include a label on the front of the shelf. An AGV 102 (e.g., a cart filling AGV 102a) may include a scanner coupled with the carrying device 226 (e.g., described below in reference to FIGS. 2A-2D), platform 218, etc., that can read signatures or markers to identify the shelf and/or determine its location. For example, the scanner may be an optical scanner configured to read visual identifiers (e.g., labels including a QR code, bar code, etc.) to determine with which shelf the carrying device 226 is aligned.

In some implementations, one or more shelves of a mobile cart 116 may be partial. A partial shelf may extend only partially underneath an item or have one or more indents, gaps, or channels, so that a carrying device 226 may more easily fit under the item to lift the item from the partial shelf or place the item on the partial shelf.

In some implementations, the storage area 124 of a delivery vehicle 104 may also include designated storage places for one or more pallets 126, for example, for larger orders.

In some implementations, the storage area 124 of a delivery vehicle 104 may include components used in an AGV guidance system of an AGV 102 (e.g., a cart loading AGV 102b) to locate itself, a mobile cart 116, a cart lock mechanism, and/or items in the delivery vehicle 104. For example, the AGV guidance system may include beacons, QR codes or other symbols, etc., for providing location information to the AGV 102. For example, the symbols or beacons may be placed on the floor, ceiling, walls, or mobile cart(s) 116 in the storage area 124. In some implementations, as described in further detail below, an AGV 102 may have an optical or radio sensor for reading the symbols or beacons, which may thereby be used to determine the location and identification of the symbols or beacons and thereby the location of AGV 102.

Figure 8:
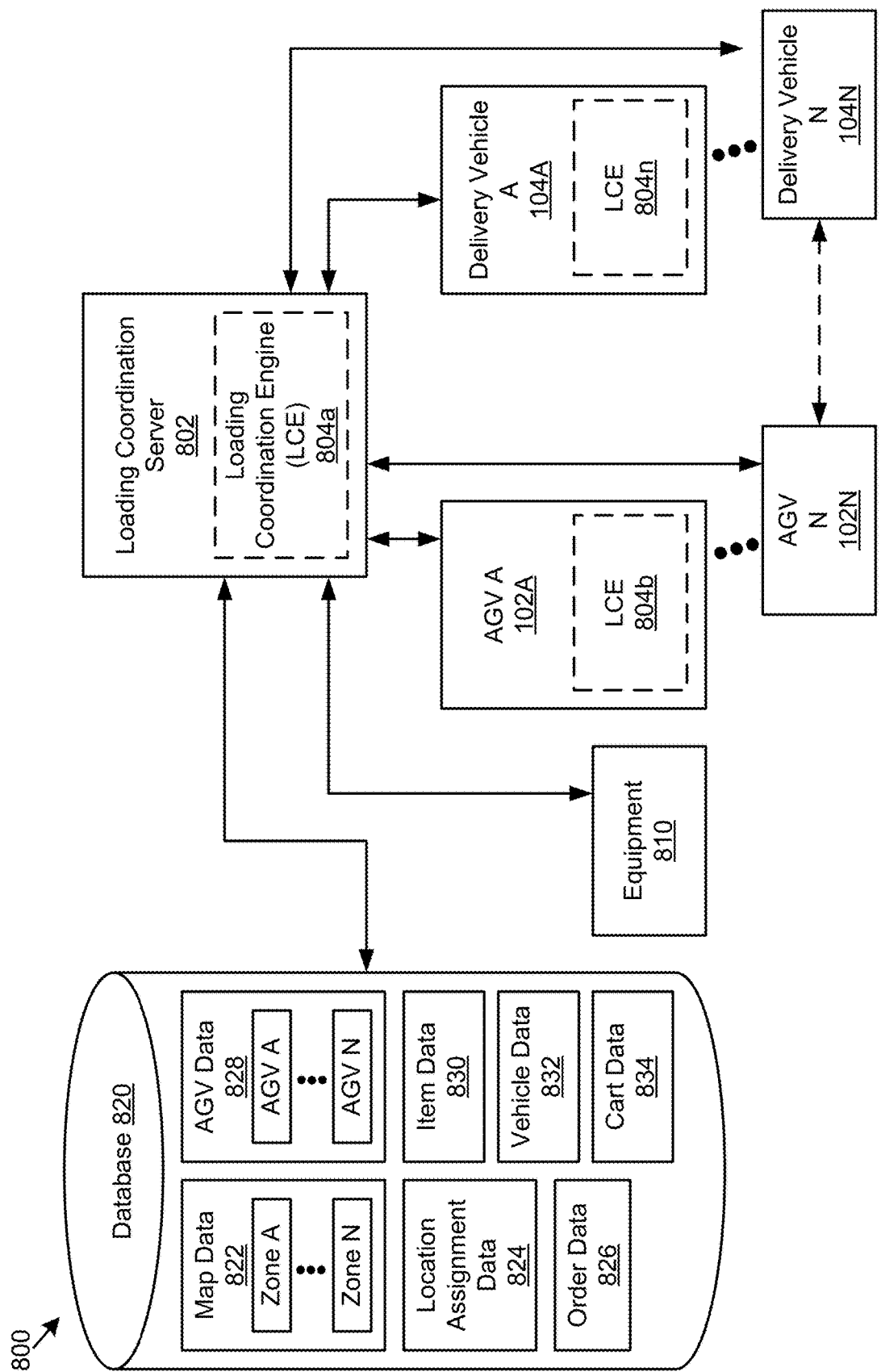
FIG. 8 is a block diagram of an example loading coordination system and data communication flow for automated loading of delivery vehicles using automated guided vehicles.

In some implementations, a delivery vehicle 104 may include a computing system that communicates with a loading coordination server 802 and/or an AGV 102, for example, as described in reference to FIG. 8. The delivery vehicle 104 computing system may include an in-dash computing system, tablet computer, smartphone, laptop, vehicle control unit, or other computing device. In some implementations, the delivery vehicle 104 computing system may perform operations of the loading coordination engine 804 described herein. In some instances, the delivery vehicle 104 computing system may communicate information with an AGV 102 associated with the delivery vehicle 104. For example, the delivery vehicle 104 computing system and AGV 102 may communicate location, speed, acceleration, current or next delivery, which delivery door to use for a particular delivery, and/or other information.

In some implementations, the delivery vehicle 104 computing system may include or communicate with a location system, such as a global positioning system device (GPS), an accelerometer, or another device capable of determining the location of the vehicle. For instance, the delivery vehicle 104 computing system may determine that the delivery vehicle 104 is arriving at a door dock 110 and transmit a notification message to the loading coordination engine 804 and/or an AGV 102 indicating arrival of the delivery vehicle 104 at the door dock 110. In some implementations, the loading coordination engine 804 may assign a door dock 110, route, mobile cart(s) 116, set of orders, or set of items, etc., to the delivery vehicle 104. For example, the loading coordination engine 804 may transmit a message to the delivery vehicle 104 computing system with instructions to dock at the assigned door dock 110.

An AGV 102 is an automated guided vehicle or robot that may be configured to autonomously manipulate items and/or mobile carts 116, for example, for use with a delivery vehicle 104, as described herein. The AGV 102 may include a drive unit adapted to provide motive force to the AGV 102 and a guidance system adapted to locate the AGV 102.

In some implementations, various types of AGVs 102 may be used to specialize in the operations described herein. For instance, a first type of AGV 102 may be a cart filling AGV 102a, which may be configured to transport items and, in some instances, place the items at designated locations, such as on shelves of a mobile cart 116. For example, a cart filling AGV 102a may include an IHM (item handling mechanism) 216 (e.g., as described in reference to FIGS. 2A-2D).

For example, the IHM 216 of an AGV 102 may retrieve an item from a conveyor mechanism 108, pallet 126, or other loading area, transport the item, manipulate the item, and/or place the item at a designated location, such as on a mobile cart 116 in a cart loading zone 132 or delivery preparation area. A loading area may be any location from which an item may be retrieved by the AGV 102a, such as at the door of a delivery vehicle 104, at a conveyor mechanism 108, on a shelf, or another defined location. Example implementations of AGVs 102a are described in further detail in reference to FIGS. 2A-2D.

In some implementations, another type of AGV 102 may be a cart loading AGV 102b, which may be configured to transport mobile carts 116 and, in some instances, lock or release a cart lock mechanism to secure or release the mobile cart 116 in the delivery vehicle 104. In some implementations, the cart loading AGV 102b or a component thereof may be configured to slide under a mobile cart 116 to lift it and transport it. In some implementations, the cart loading AGV 102b may be configured to couple with a mobile cart 116 from an end or a side and push or pull the mobile cart 116 into the delivery vehicle 104. Example implementations of AGVs 102b are described in further detail in reference to FIG. 3.

It should be noted that although multiple types of AGVs 102 (e.g., various cart filling AGVs 102a and cart loading AGVs 102b) are described herein, the components and/or operations of these various AGVs 102 may be combined or differentiated without departing from the scope of this disclosure. For example, a cart filling AGV 102a and a cart loading AGV 102b may be combined as a single AGV 102 that can perform both cart filling and cart loading operations.

In some implementations, the loading environment 100 may include a conveyor mechanism 108 for bringing items to the loading bay 106. For example, the conveyor mechanism 108 may include a conveyor belt, roller wheels, skate wheel conveyor, etc., or may include another device, such as an AGV 102 configured to bring items to the loading bay 106 from a warehouse, for example. The conveyor mechanism 108 may be motor driven or may be driven by gravity, etc. The conveyor mechanism 108 may include handling mechanisms to route items to different door docks 110, etc. In some implementations, the conveyor mechanism 108 may include or be coupled with scanners that scan items to determine their attributes. For example, a scanner may scan a label on the item, and, based on the content of the label, the loading coordination engine 804 may track an item or determine attributes of the item, such as its delivery destination, weight, dimensions, priority, appropriate delivery vehicle 104 door, etc.

The loading coordination engine 804 may use computer logic to coordinate execution of tasks among the components of the loading coordination system 800. For example, the loading coordination engine 804 may route items among a conveyor mechanism 108, cart filling AGV(s) 102a, a mobile cart 116 (e.g., which may be transported by a cart loading AGV 102b), and delivery vehicle 104. In some instances, the loading coordination engine 804 may also communicate with a computing system of a warehouse, store, or fulfillment center where the loading bay 106 is located in order to prepare items and coordinate the components of the loading coordination system 800 with the operations of the warehouse, store, or fulfillment center. Details of the operations of the loading coordination system 800 are described in further detail in reference to the flowcharts herein, for example.

In some implementations, the loading coordination engine 804 may direct a conveyor mechanism 108 to bring a particular item to the loading bay 106 (or specific part of the loading bay 106, particular door dock 110, particular cart loading zone 132, etc., associated with a delivery vehicle 104 and/or mobile cart 116), while, in some implementations, a scanner communicatively coupled with the loading coordination engine 804 may scan an item on the conveyor mechanism 108 thereby determining its attributes (e.g., a delivery vehicle 104, a location in a delivery vehicle 104, a delivery destination, its size, etc.).

As illustrated, in some implementations, the loading coordination engine 804 may direct a first AGV 102a to retrieve the item from the loading area, transport the item within the loading bay 106, and place the item at a determined location on the mobile cart 116 in the cart loading zone 132. As illustrated, a second AGV 102b may couple with the mobile cart 116b in the cart loading zone 132 and transport the mobile cart 116b to a designated location in the delivery vehicle 104.

It should be noted that the operations described in reference to FIG. 1 are provided by way of example and that other implementations are possible and contemplated herein.

Figure 2A:
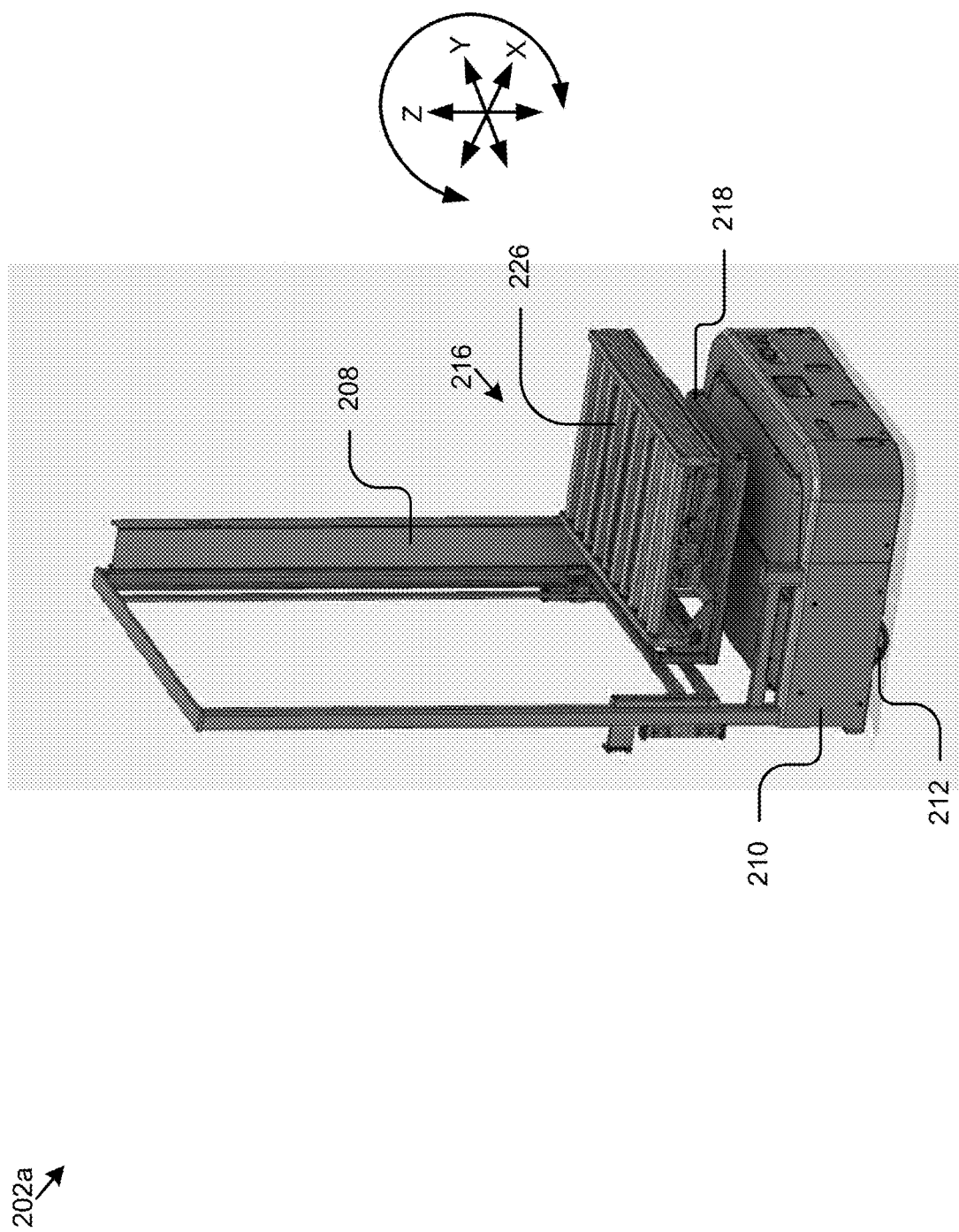

FIGS. 2A-2D are illustrations of example AGVs 202 according to some implementations described herein, for instance, the example AGVs 202 in FIGS. 2A-2D may represent cart filling AGVs 102a. FIG. 2A depicts an example AGV 202a, which may include an AGV body 210, a drive unit 212 housed within or coupled to the body 210, a power source (not shown) housed within or coupled to the body 210, an IHM 216, a guidance system (not shown), and one or more controllers (not shown), although other configurations are possible and contemplated herein. Depending on the implementation, some or all of the features and operations of the example AGVs 202a, 202b, and 202c discussed in reference to FIGS. 2A-2D may be interchanged, omitted, duplicated, or replaced. For example, a feature discussed in reference to the example AGV 202a in FIG. 2A may be used with the AGV 202b in FIG. 2B, or a feature discussed in reference to the example AGV 202b in FIG. 2B may be used with the example AGV 202a in FIG. 2A. Similarly, in some implementations, the AGV 302 described in reference to FIG. 3 may include some of the features described in reference to the AGVs 202 described in FIGS. 2A-2D or vice versa. Further, some features may be described in reference to one of the figures herein (e.g., FIGS. 2A-2D or FIG. 3), but not the other figures in order to simplify the description and reduce repetition, although they may be applicable to some or all of the figures.

The body 210 may include a front, a rear opposing the front, a left side extending from the front to the rear, and a right side opposing the left side and extending from the front to the rear. The body 210 may be configured to house a drive unit 212, power source, controller, and/or other components of the AGV 202a.

The drive unit 212 may be coupled to the body 210 and configured to receive power from the power source to provide motive force to the AGV 202a and propel the AGV 202a within an operating environment. In some implementations, the drive unit 212 may receive instructions from one or more controllers instructing the drive unit 212 to cause the AGV 202a to move forward, backward, sideways, turn, or perform another movement. In some implementations, the drive unit 212 may include electric motors and wheels, although other configurations, such as treads are possible. In some implementations, the drive unit may include wheels configured to roll along rails or a track in the loading bay 106, thereby improving stability and the ability of the AGV 102 to locate itself.

The drive unit 212 may be wirelessly coupled via a controller to a wireless interface and a wireless communications network to receive control signals from the loading coordination engine 804 and/or other components of the system 800. In some implementations, the drive unit 212 may be controlled as described in elsewhere herein, which may be executed using a distributed computing system comprising AGVs 202, servers (e.g., the loading coordination server 802), controllers, etc., for example, as shown in the system depicted in FIG. 8.

The power source may be coupled to the components of the AGV 202a to provide power to the components, for example, the power source may provide power to the IHM 216, the drive unit 212, a controller, or another component of the AGV 202a. The power source may include a battery, a wire, contact track (e.g., integrated with the stability mechanism or otherwise in the delivery vehicle 104 or loading bay 106), induction charger, alternator or gas generator, etc.

The item handling mechanism or IHM 216 may include a carrying device 226 and, in some instances, a robotic device (e.g., an elevator 208, adjustable platform 218, robotic arm, etc.) moving the carrying device 226 to, for example, retrieve items from a loading area and transport them to a designated location on a mobile cart 116. In some implementations, the IHM 216 may also be configured to retrieve items from shelves and place them at a designated location, such as adjacent to a door in the delivery vehicle 104, etc.

In some implementations, the IHM 216 may include a robotic arm, platform 218, or other device for extending a carrying device 226 from an AGV 202 to a mobile cart 116 that is separate from the AGV 202. In some implementations, the IHM 216 may be configured so that a carrying device 226 fits next to a shelf or other part of a mobile cart 116 when the AGV 202 is at a point proximate to an assigned location on the mobile cart 116, so that a carrying device 226 does not need to be extended to interact with an item or place it on the mobile cart 116. In some implementations, the IHM 216 may have one, two, three, or more degrees of freedom to move the carrying device 226 along one, two, three, or more axes thereby allowing the IHM 216 to retrieve an item from a loading area and place the item at a target location, such as on a mobile cart 116. Similarly, in some instances, the IHM 216 may be configured to retrieve an item from a shelf and place it at a second location, such as adjacent to a door or on a platform for retrieval by a delivery person or delivery AGV 102.

In some implementations, the IHM 216 may include a mast having an elevator 208 coupled with the body 210. The elevator 208 lifts and lowers a platform 218 supporting a carrying device 226. The elevator 208 moves the IHM 216 along a Z axis to lift and set down the item.

In some implementations, a platform 218 extends or retracts the carrying device 226 horizontally between the AGV 202*a* and a mobile cart 116, loading area, or delivery vehicle 104 door. In some implementations, the platform 218 may also extend or retract the carrying device 226 into or out of one or more of AGV 102 shelves 214 (e.g., as in the example AGV 202*b* illustrated in FIG. 2B) to place an item on one of the AGV shelves 214.

In some implementations, the platform 218 and/or carrying device 226 may include a set of rollers or a conveyor belt that, when stationary, hold an item in a stationary position on the AGV 202. In some implementations, the rollers or conveyor belt may turn, thereby moving an item sideways (e.g., in a Y direction) relative to the direction of motion of the AGV 202 and into a shelves on a mobile cart 116, for example. In some implementations, the rollers or conveyor belt may turn, thereby moving an item forward or backward (e.g., in an X direction) relative to the direction of motion of the AGV 202 and into a shelves on a mobile cart 116, for example.

In some implementations, the IHM 216 includes a moveable platform 218 supporting a carrying device 226 and capable of translating the carrying device 226 along a plane in one, two, or more dimensions and/or rotating about a vertical axis. For example, the platform 218 (or other component of the IHM 216, depending on the implementation) may translate the carrying device 226 along X and/or Y coordinates (e.g., sideways/left and right relative to the front of the AGV 202*a*; forward and backward relative to the front of the AGV 202*a*; etc.).

In some implementations, the platform 218 may comprise two platforms coupled to one another, a first of which moves along a first horizontal axis and a second of which moves along a second horizontal axis perpendicular to the first horizontal axis. For instance, the first platform may be coupled with the elevator 208 and the second platform, so that the first platform may move the second platform along the first horizontal axis. The second platform may be coupled with the first platform and the carrying device 226, so that the second platform may move the carrying device 226 along the second horizontal axis.

In some implementations, the platform 218 may be configured to rotate a carrying device 226, such as the forks or rollers, so that the carrying device 226 may extend or be extended about a horizontal plane, as described above. For instance, the carrying device 226 may extend and then retract along a first horizontal axis to retrieve an item, as described above. Once the carrying device 226 has retracted, the platform 218 may rotate the carrying device 226, so that it may be extended along a second horizontal axis, for example, to place the item on a shelf, whether on the AGV 202, as described in reference to FIG. 2B, or on a mobile cart 116.

In some implementations, the IHM 216 may include a carrying device 226 in the form of forks, which may extend outward from the AGV 202 to interface with an item, for example, in a loading area or mobile cart 116, and may be retractable, so the forks may be placed at any desired height and maneuvered underneath an item and to lift the item from a first location during extraction of the item from the loading area or placement of the item on a mobile cart 116.

In some implementations, the IHM 216 may include a robotic arm, which moves a carrying device 226. The robotic arm may pivotable or otherwise articulable to extend the carrying device 226 in order to lift the item from a loading area, transport it from the loading area to a designated location, and place it at the designated location. The elevator 208 may raise or lower the robotic arm to interact with various shelves of a mobile cart 116.

In some implementations, the AGV 202*a* may include a scanner coupled with the carrying device 226, platform 218, or body 210, etc., that can read signatures or markers to determine locations of scanned objects. For example, the scanner may be an optical scanner configured to read visual identifiers (e.g., labels including a QR code, bar code, etc.) to determine with which shelf (or an AGV shelf 214) the IHM 216 or the carrying device 226 is aligned. The optical scanner may scan a marker on a shelf or other location on a mobile cart 116, for example. The shelf marker may indicate a position and/or identification of a shelf, for example.

In some implementations, the elevator 208 may include positional sensors to determine the position of IHM 216 and/or to align the carrying device 226 with a target shelf (whether an external or integrated with the AGV 202, such as an AGV shelf 214).

The carrying device 226 may be coupled to or integrated with the IHM 216 and is configured to support and/or move one or more items. In some implementations, the carrying device 226 is connected at a distal end of the IHM 216. The carrying device 226 may be movable by the IHM 216 vertically, for instance. The carrying device 226 may be extendable by the IHM 216 using the range of motion to retrieve a certain item from a loading area, shelf, other AGV 202, etc., and place the item at a second location within reaching distance of the IHM 216.

In some implementations, the carrying device 226 may include or have attached thereto, components such as forks, a surface that may extend under an item, arms that may extend to the sides of an item to pinch or otherwise grasp the item, a crane with a claw device to lift an item, a clamp arm, motorized rollers, a conveyor belt, one or more suction cups, rollers, etc., or a combination of two or more such components. For example, a carrying device 226 may include rollers and a suction cup, the suction cup extending (e.g., on an arm) from the carrying device 226 into a mobile cart 116 to push an item from the carrying device 226 onto a shelf of the mobile cart 116. The suction cup may be powered by a compressor on the AGV 202, for example. The carrying device 226 may be made of any material, such as plastic or metal, which is sufficiently strong to support an item.

In some implementations, a controller of the AGV 202 may determine attributes of an item to be picked up by the carrying device 226 and use those attributes to more accurately handle the item. For instance, the controller may read a label and/or communicate with the loading coordination engine 804 to determine dimensions and/or weights of the item thereby allowing the controller to determine, for example, a grip or suction force, or a position of the item on the carrying device 226.

The AGV 202*a* may include a guidance system that determines a location of the AGV 202*a* within an operating environment. For instance, the guidance system may include one or more sensors that detect and process navigation markers (e.g., QR codes, radio frequency identification or RFID labels, etc.) to locate the AGV 202*a* while the AGV 202*a* traverses the operating environment. The guidance system may be coupled to a controller of the AGV 202a, which may, in some instances, include local object detection intelligence and processing to avoid collision with other objects (e.g., AGVs 202, humans, items, mobile carts 116, etc.) in the operating environment.

In some implementations, the guidance system of the AGV 202 may include an accelerometer, GPS sensor, cellular radio, etc., to determine its location, acceleration, velocity, etc.

The AGV 202a may include one or more controllers coupled with the guidance system, IHM 216, drive unit 212, loading coordination engine 804, etc., to perform operations described herein. For instance, the one or more controllers may receive a signal from the loading coordination engine 804 and, in response, may signal the drive unit 212 to propel the AGV 202a. The one or more controllers may communicate with the guidance system to determine a location of the AGV 202a within the operating environment and, using the drive unit 212, navigate through the operating environment. For example, the one or more controllers may receive a signal from the loading coordination engine 804 indicating to retrieve a particular item from a retrieval location, such as a loading area, conveyor mechanism 108, shelf, etc., in response to which, the one or more controllers may instruct the drive unit 212 to position the IHM 216 adjacent to the retrieval location using the current location determined by the guidance system and then direct the IHM 216 to retrieve the item, for example. Similarly, the one or more controllers may instruct the drive unit 212 to position the IHM 216 adjacent to an assigned location of an item, for instance, on a mobile cart 116 in a cart loading zone 132.

Figure 2B:
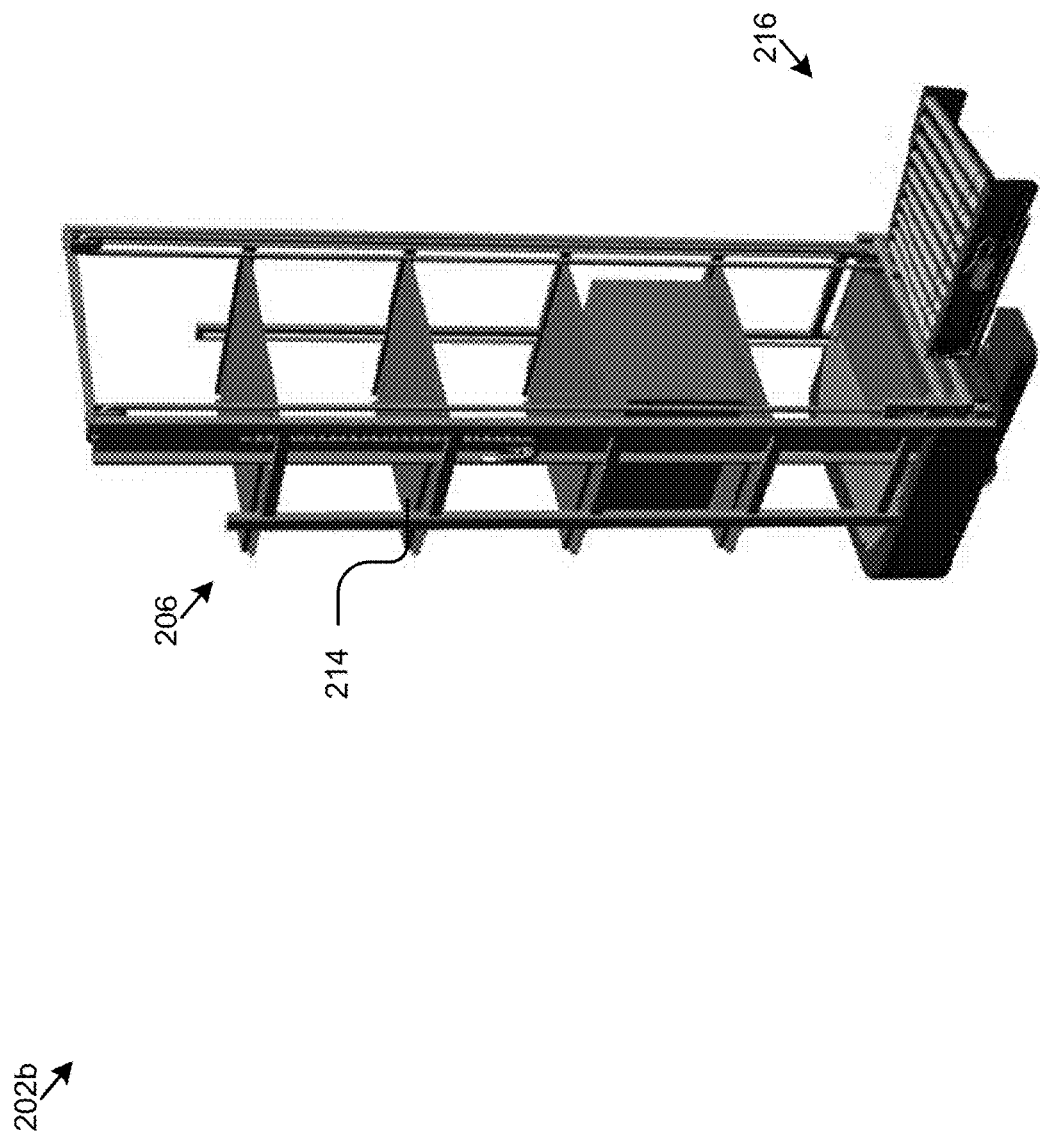

FIG. 2B describes another example AGV 202b with AGV 102 item storage rack 206 with one or more AGV shelves 214. The example AGV 202b may be used both inside and outside of the delivery vehicle 104, or used solely outside the delivery vehicle 104, for example. As illustrated, the AGV 202b may include an AGV 102 item storage rack 206 with a plurality of shelves arranged vertically. The IHM 216 may also include a mast having an elevator 208 and a platform 218, which may be raised or lowered using the elevator 208. The platform 218 may extend the carrying device 226 along a first direction toward the AGV 102 rack 206 or, perpendicularly to the first direction, toward a mobile cart 116 adjacent to the AGV 202, depending on the implementation.

Some implementations of the AGV 202 may include an AGV 102 item storage rack 206 (also referred to as AGV rack 206), such as illustrated coupled with the example AGV 202b. While the AGV rack 206 is illustrated as coupled to the top of the body 210, other configurations are possible, for example, the AGV rack 206 may be coupled in front of, behind, to the side of, or even towed or pushed by the AGV 202. The AGV rack 206 may be positioned proximate to the IHM 216, so that the shelves 214 are within reach of the IHM 216 for the IHM 216 to place items on or retrieve items from the shelves 214.

The AGV rack 206 may include a single shelf 214 or a plurality of shelves 214 coupled to a frame. The shelves 214 may include flat surfaces, bays, containers, or other mechanisms for holding an item. Where equipped, a shelf 214 may be capable of storing the item during transit of the AGV 202.

The plurality of shelves 214 may be vertically arranged and, in some implementations, one or more of the shelves 214 may have an adjustable height (e.g., adjusted manually or automatically using a motor coupled with the AGV 202b) on the AGV rack 206. In some implementations, a controller of the AGV 202b may determine a current height of a particular shelf of the plurality of shelves 214 (or, for instance, a loading area, item, other shelves, or a location on the mobile cart 116), for example, using an optical scanner or retrieving a stored height of a particular shelf from a database. For example, one or more of the shelves 214 may include a marker readable by an optical scanner coupled with the IHM 216 or carrying device 226 to indicate to the IHM 216 a location or identification of the a particular shelf. In some implementations, a controller of the AGV 202b may store a shelf identifier for a shelf 214 in association with a height or size of the shelf 214, or an identifier of an item stored on the shelf 214.

In some implementations, a shelf 214 onto which an item is placed may be selected based on the size, height, weight capacity, or other attributes of the shelf 214. For example, an item of a given size may be placed on a shelf 214 having a corresponding size. In another example, in response to an item having a threshold weight, it may be placed on a lower shelf 214 than an item having a lighter weight than the threshold.

It should be noted that, although scanning, adjusting, selecting, etc., are described in reference to the AGV shelves 214 in the AGV rack 206, the same processes and mechanisms may be used with the shelves described in reference to the mobile cart 116, for example.

Figure 2C:
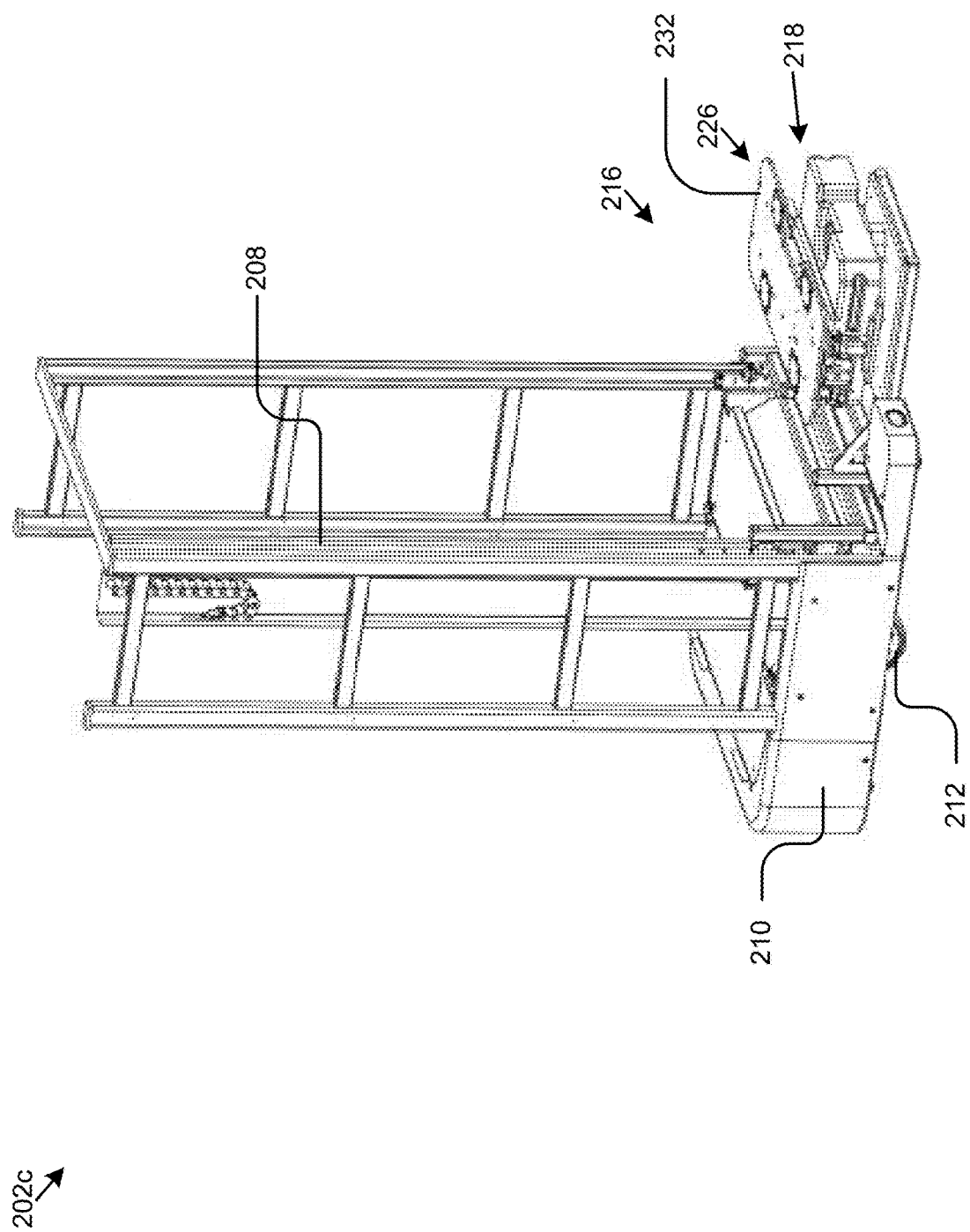

FIGS. 2C and 2D describe another example AGV 202c with an AGV body 210, drive unit 212, elevator 208, and IHM 216. The IHM 216 of the example AGV 202c may include a carrying device, platform 218, and carrying surface 232. The example AGV 202c may be used outside of the delivery vehicle 104 to bring items to the delivery vehicle 104 or transport items from the delivery vehicle 104, may be used both inside and outside of the delivery vehicle 104, or used solely inside the delivery vehicle 104, for example. In some implementations, as illustrated in FIG. 2D, the AGV 202c may include a connection point 242 on the body 210 for one or more of a compressor, power, or electronic signal, as described above (e.g., the connection point 242 may be electronically coupled with a controller, IHM 216, drive unit 212, or other component of the AGV 202c). For example, the connection point 242 may include a data port for programming or control of the AGV 202c. In some implementations, the AGV 202c may include an auto charger plug point 246 at which the AGV 202c may automatically couple with a charger. In some implementations, the AGV 202c may include an optical sensor 244 on the body 210, IHM 216, etc., which allows the AGV 202c to locate itself and/or an item, for example, using a surface of the delivery vehicle 104, a marker in an operating environment, and/or a label on an item.

Figure 3:
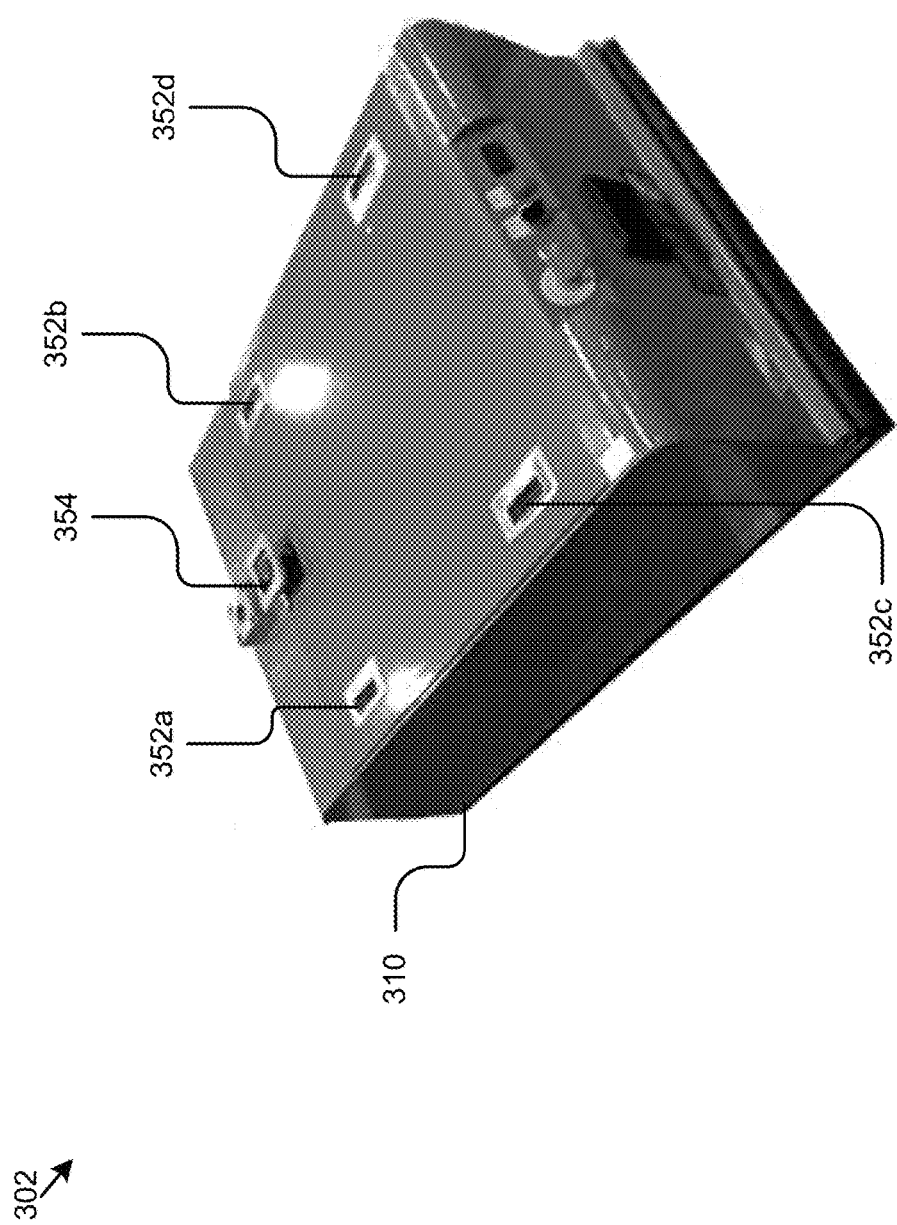
FIG. 3 is an illustration of an example automated guided vehicle for loading a mobile cart into a delivery vehicle.

FIG. 3 is an illustration of an example AGV 302 for loading a mobile cart 116 into a delivery vehicle 104. The example AGV 302 may represent an example implementation of a cart loading AGV 102b, for example, as described throughout this disclosure. The AGV 302 may include a body 310, drive unit (not visible in FIG. 3) housed within or coupled to the body 310, a power source (not shown) housed within or coupled to the body 310, a guidance system (not shown), and one or more controllers (not shown), although other configurations are possible and contemplated herein. The drive unit, power source, guidance system, and controllers of the AGV 302 may correspond to those described in reference to FIGS. 2A-2D.

The body 310 may include a front, a rear opposing the front, a left side extending from the front to the rear, and a right side opposing the left side and extending from the front to the rear. While various shapes and construction materials to the body 310 are possible, the body 310 may be configured to fit between rows of shelving in a delivery vehicle 104, between shelving and a wall of the delivery vehicle 104, underneath a mobile cart 116, etc. The body 310 may be configured to house a drive unit, power source, controller, and/or other components of the AGV 302.

In some implementations, the body of the AGV 302 may be configured to fit underneath a mobile cart 116 while being large enough to accommodate wheels (e.g., as part of the drive unit of the AGV 302) to allow the AGV 302 to travel over a threshold of the door dock 110, such as a dock plate. In some implementations, the body may also house a suspension system (not shown) coupled with the drive unit that allows the AGV 302 to travel over uneven surfaces.

The drive unit of the AGV 302 may include or couple with the suspension system to support the body 310. For example, the suspension system may include a hydraulic or pneumatic suspension that may allow the body 310 to raise or lower. For instance, the body 310 may raise when traversing rough terrain. In another example, the suspension may lower the body to fit under a mobile cart 116 and then lift the body, which in turn may lift the mobile cart 116 and/or couple with the mobile cart 116, depending on the implementation.

In some implementations, the drive unit may include, for example, wheels mounted to one or more turn tables, casters, treads, etc., to allow the AGV 302 to move in any direction or to rotate, thereby allowing the AGV 302 to navigate within a delivery vehicle 104.

In some implementations, the AGV 302 may include one or more coupling points 352a, 352b, 352c, and 352d, which may couple with corresponding points on a mobile cart 116. For instance, the coupling points 352 may lift, and/or be lifted by the body 310 and suspension, to couple the AGV 302 with the mobile cart 116. For example, the coupling points 352 may include recesses that may receive and retain matching protrusions in the bottom of a mobile cart 116, although other implementations are possible and contemplated herein.

Additionally or alternatively to the coupling points 352, in some implementations, the AGV 302 may include a coupling mechanism that couples with a mobile cart 116 to push or pull the mobile cart 116. In some implementations, the coupling mechanism may clamp, grasp, or otherwise attach to the mobile cart 116 to allow the AGV 302 to securely move the mobile cart 116.

In some implementations, the AGV 302 may include an optical (e.g., laser, infrared, etc.) scanner 354, which detects markers or objects proximate to the AGV 302. For instance, the optical scanner 354 may scan a label or navigation marker. In some implementations, the optical scanner 354 may include a LiDAR (light detection and ranging) sensor.

In some implementations, the AGV 302 may include a cart lock interface (not shown), which may be coupled with the body 310. The cart lock interface may interact with a cart lock on a mobile cart 116 and/or delivery vehicle 104 to lock or release the cart lock. For instance, the cart lock interface on the AGV 302 may exert force on or otherwise signal a cart lock on the mobile cart 116 or delivery vehicle 104 to actuate its locking mechanism. In some implementations, the cart lock interface may include a gear coupled with the AGV 302 that turns a gear causing a cart lock to lock or release.

In some implementations, the cart lock interface may signal or power a motor coupled with a cart lock. For instance, the cart lock interface may wirelessly transmit a signal to a computing device coupled with the cart lock (e.g., in the mobile cart 116 or the delivery vehicle 104), which in turn causes the computing device to actuate the cart lock. In some implementations, the cart lock interface may include one or more electrical contacts that, when contacting corresponding contacts on the mobile cart 116 or delivery vehicle 104, sends a signal or provides power to a motor of the cart lock, thereby causing the cart lock to secure or release the mobile cart 116.

The cart lock, as described elsewhere herein, may include corresponding wireless radios, electrical contacts, or mechanical interfaces (e.g., a gear, clutch plate, etc.) to interact with the cart lock interface of the AGV 302. In some implementations, the cart lock interface may electrically or mechanically couple with the cart lock allowing the AGV 302 to control the locking and release of the mobile cart 116, so that when the delivery vehicle 104 moves, the mobile cart 116 does not tip, slide, roll, etc., within the delivery vehicle 104, but may be removed and transported to a cart loading zone 132 where it may have items placed thereon.

Figure 4:
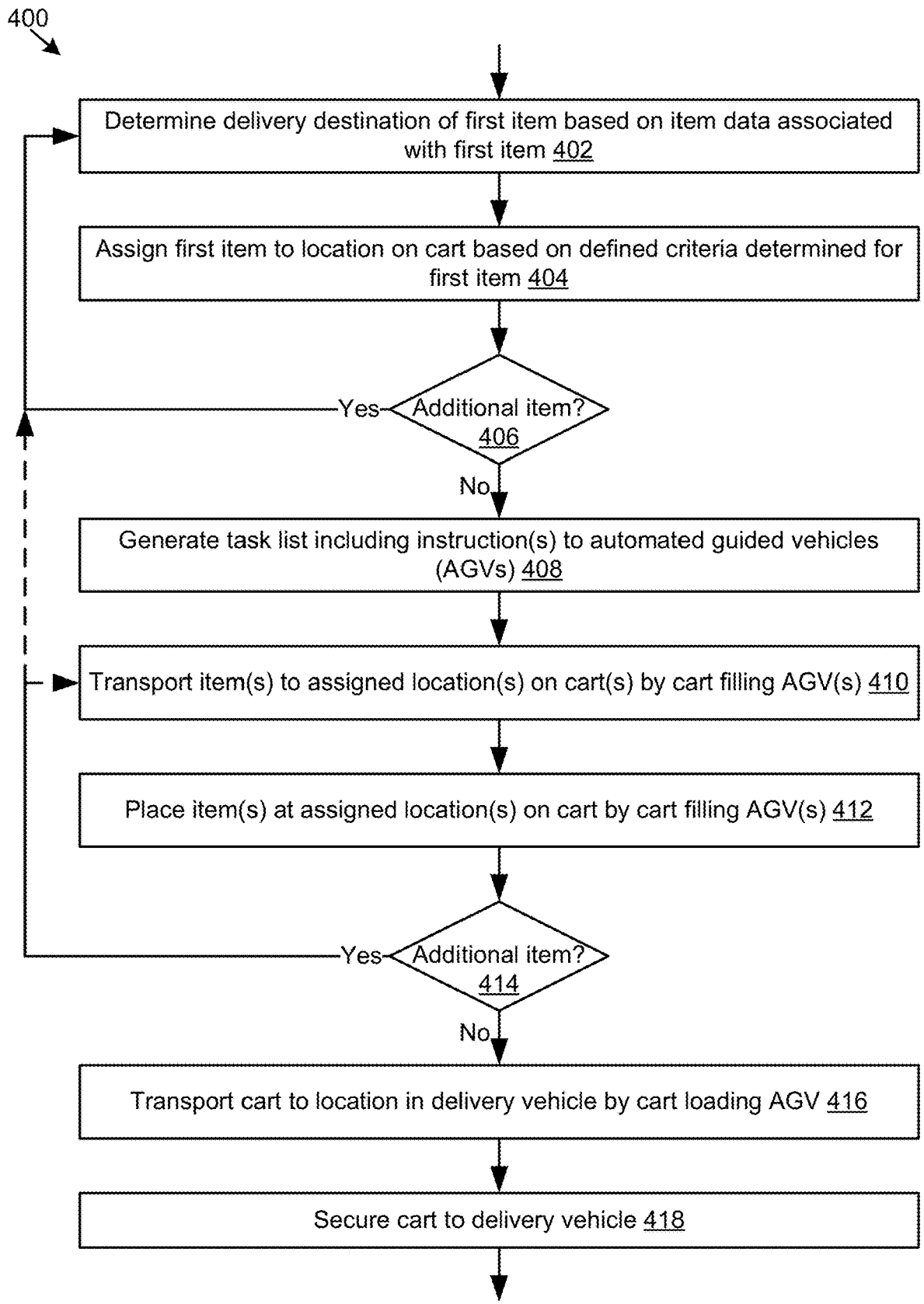
FIG. 4 is a flowchart of an example method for automated loading of delivery vehicles using mobile carts and automated guided vehicles.

FIG. 4 is a flowchart of an example method 400 for automated loading of delivery vehicles 104 using an AGV 102. As discussed in reference to FIG. 8, a loading coordination system may include computing systems associated with a cloud server, AGV(s) 102, delivery vehicle 104, conveyor mechanism 108, or warehouse, etc. In some implementations, a set of items may be inducted into the loading-coordination system in response to receiving item data identifying attributes of the set of items. An order received by the loading coordination engine 804 may include one or more items, a delivery address, delivery or profile attributes, or other information. The loading coordination engine 804 may assign items and/or orders to a delivery vehicle 104 or door dock 110 associated with the delivery vehicle 104 based on delivery destinations of the items, current or projected load of delivery vehicles 104, etc. The loading coordination engine 804 may instruct a conveyor mechanism 108 to transport the item to the delivery vehicle 104, door dock 110, or loading area, and may instruct an AGV 102 to retrieve the item from the loading area and place it at a designated location on the mobile cart 116. These and other implementations are described in further detail below, for example, in reference to the methods described in FIGS. 4-7.

In some implementations, the loading coordination engine 804 may transmit a signal(s) identifying items, item attributes, loading areas, delivery vehicles 104, designated locations in delivery vehicles 104, etc., to one or more conveyor mechanisms 108, delivery vehicles 104, or AGVs 102. Other information such as identification of a loading area, location on a mobile cart 116, location in a delivery vehicle 104, time window for the items to be at designated locations, routing directions, priority, traffic of other AGVs 102, item dimensions, etc., may also be transmitted in the signal to the components of the loading coordination system 800.

At 402, the loading coordination engine 804 may determine a delivery destination of a first item based on item data associated with the first item. In some implementations, the loading coordination engine 804 may receive order information identifying the item and the delivery destination, for example, as received from an e-commerce system, a warehouse system identifying outgoing items/orders, etc.

In some implementations, a scanner or other device communicatively coupled with the loading coordination engine 804 may scan or otherwise capture the item, or label attached to the item, as the item is picked up by an AGV 102, as the item passes a point on a conveyor mechanism 108 bringing the item from a warehouse or store to the loading bay 106, or when scanned by a computing device of a human worker. For example, a scanner coupled with the conveyor mechanism 108 and communicatively coupled with the loading coordination engine 804 may scan a label attached to an item as it passes on the conveyor mechanism 108, and the loading coordination engine 804 may determine a delivery destination and/or assign the item to a door dock 110 (e.g., associated with a particular delivery vehicle 104 and/or delivery route), delivery vehicle 104, and/or designated location in the delivery vehicle 104 (e.g., as described in reference to FIG. 7). For instance, a conveyor mechanism 108 may bring the item to the appropriate door dock 110 in the loading bay 106 based on the scanned label.

In some implementations, the loading coordination engine 804 may assign the item to a door dock 110 associated with a delivery vehicle 104, a delivery vehicle 104 associated with a particular door dock 110, a mobile cart 116 associated with a delivery vehicle 104, etc., based on the delivery destination of the item, as described in further detail below.

At 404, the loading coordination engine 804 may assign the first item to a location on a mobile cart 116, for instance, based on defined criteria determined for the first item. The assignment to the location may be based upon the delivery destination of the item, the door of the delivery vehicle 104 to be used (e.g., as identified in the order or item data; that will be near the assigned location on the mobile cart 116, etc.), dimensions of the item, weight of the item, dimensions of available spaces on the mobile cart 116, or other factors, as described elsewhere herein.

In some implementations, the loading coordination engine 804 may determine a correlation of available or assigned locations on a mobile cart 116 with where those locations will be once the mobile cart 116 is placed in a designated location in the delivery vehicle 104. For instance, a location may assigned in a storage area 124 of a given delivery vehicle 104 and transformed into a mobile cart 116 location or vice versa, based on a location of a mobile cart 116 relative to the storage area in which the mobile cart 116 is located (e.g., current, previous, designated, assigned, etc., location) a delivery vehicle 104.

In some implementations, items are assigned to locations on the mobile cart 116 and/or in the delivery vehicle 104 based on the order in which they are received by the AGV 102 (e.g., a cart filling AGV 102a). For example, the AGV 102 may place items received at a first end of the mobile cart 116 and moving toward a second end (or from top to bottom, front to back, etc.). An example method for assigning items to locations on the mobile cart 116 and/or in the delivery vehicle 104 is described in reference to FIG. 7.

In some implementations, at 406, the loading coordination engine 804 may determine whether there is an additional item assigned to the mobile cart 116 and/or delivery vehicle 104. In response to determining that there is an additional item, the loading coordination engine 804 may determine the delivery destination of the next item and assign the next item to a location on the mobile cart 116 by iterating the operations at 402 and 404. In response to determining that there is not (or not yet, as described below) an additional item in a queue of items to be assigned or that have been assigned to the mobile cart 116 and/or delivery vehicle 104, the method 400 may continue to 406, for example. It should be noted that the operation 406 may occur in another order in the method 400 or be omitted, depending on the implementation.

At 408, the loading coordination engine 804 may generate a task list including instruction(s) to an AGV(s) 102 to perform operations to prepare items for a delivery vehicle 104. The task list may include tasks for the placing a current item and/or a series of items on the mobile cart 116, transporting items to a mobile cart 116, transporting mobile carts 116 into delivery vehicles 104, etc. For example, the loading coordination engine 804 may generate a task list including a first instruction to a first AGV 102a to position the item on the mobile cart 116 based on the assigned location and a second instruction to a second AGV 102b to transport the mobile cart 116 to a delivery vehicle 104.

In some implementations, the task list may include one or more tasks identifying one or more items to retrieve, transport, and/or place at a designated location on a mobile cart 116. The task list may also include one or more tasks identifying a mobile cart 116, a delivery vehicle 104, and/or a location in a delivery vehicle 104. In some implementations, the task list may be specific to each component of the loading coordination system (e.g., a cart filling AGV 102a, a cart loading AGV 102b, a delivery vehicle 104, or a conveyor mechanism 108) or may include tasks for multiple components (e.g., AGV 102a and 102b). Example tasks that may be included in the task list may be described in further detail below, for instance, in reference to FIGS. 4-7.

In some implementations, the task list may include a defined route of a cart filling AGV 102a in the loading bay 106 and/or the delivery vehicle 104. The task list may additionally or alternatively identify movements of an IHM 216 of the cart filling AGV 102a, for example, as described in reference to FIG. 6A. The task list may, in some instances, include a schedule indicating when to retrieve items, place items at designated locations, lock into place using a stability mechanism in the delivery vehicle 104, or perform other operations.

In some implementations, the task list may include a defined route of a cart loading AGV 102b in the loading bay 106 and/or the delivery vehicle 104. The task list may identify movements of the cart loading AGV 102b relative to the mobile cart 116 or delivery vehicle 104, operations of a cart lock mechanism in the delivery vehicle 104, or a coupling mechanism 352 of the cart loading AGV 102b allowing the cart loading AGV 102b to couple with the mobile cart 116 during transportation of the mobile cart 116, among other potential operations. The task list may include a schedule and/or conditions defining when to move the mobile cart 116, lock the mobile cart 116 in place, etc., as described herein.

At 410, the loading coordination engine 804 may transport the item(s) to the assigned locations on the mobile cart 116 using an AGV 102 (e.g., a cart filling AGV 102a). The cart filling AGV 102a may transport one or more items from an item loading area to a point proximate to the assigned location on the mobile cart 116. For instance, the loading coordination engine 804 may transmit an instruction including or based on the task list to a controller of the AGV 102 to navigate the AGV to an item loading area, retrieve the item from the item loading area, and then navigate to a point proximate to the assigned location on the mobile cart 116, which may be located in a cart loading zone 132. Further detail of 410 may be found in the example operations of the AGV(s) 102 for navigation and transportation of items described in further detail in reference to FIG. 6A.

At 412, the loading coordination engine 804 may instruct a controller of the AGV 102 to place place, by the AGV 102 (e.g., a cart filling AGV 102a), the first item at the assigned location on the mobile cart 116 based on the task list. For example, the AGV 102 may automatically put an item on a shelf of the mobile cart 116. In some implementations, the AGV 102 may place the item at an assigned location and/or in a defined sequence, for example, as determined in the example method described in reference to FIG. 7. In some implementations, the AGV 102 may articulate an IHM 216 to put the item on the shelf, for example, as described in the example method of FIG. 6A.

In some implementations, at 414, the loading coordination engine 804 may determine whether there is an additional item to be placed on the mobile cart 116 (e.g., based on the task list). In some implementations, in response to determining that there is an additional item, the method 400 may continue to operation 402 where the loading coordination engine 804 determines a delivery destination of the next item and/or assigns the next item to a location on the mobile cart 116 (e.g., by iterating the operations at 402 and/or 404). In some implementations, in response to determining that there is an additional item, the loading coordination engine 804 may continue to operation 410 (e.g., when a destination has been determined and/or a location has been assigned for the next item) where the next item is transported to the assigned location on the mobile cart 116 by the cart filling AGV 102a (e.g., by iterating the operations at 410 and/or 412). In response to determining that there is not (or not yet, as described below) an additional item to be loaded on to the mobile cart(s) 116 (e.g., based on the task list or a presence of the next item at the loading area), the method 400 may continue to 416.

In some implementations, at 416, the loading coordination engine 804 may instruct the AGV 102 to transport the mobile cart 116 from the cart loading zone 132 into a securable position in the delivery vehicle 104 using. For instance, the loading coordination engine 804 may transmit an instruction including or based on the task list (e.g., based on the task list or completion thereof) to a cart loading AGV 102b to transport the mobile cart 116 to a defined location in the delivery vehicle 104. For example, the cart loading AGV 102b may navigate to a mobile cart 116 in a cart loading zone 132, couple with the mobile cart 116, and then navigate to the delivery vehicle 104 to place the mobile cart 116 in or on the delivery vehicle 104. Further detail of the operation at 416 may be found in the example operations described in further detail in reference to FIG. 6B. A securable position may be a position or location at which the mobile cart 116 may be secured to the delivery vehicle 104, for example, using a cart lock as described below.

In some implementations, at 418, the loading coordination engine 804 may secure the mobile cart 116 to the delivery vehicle 104, for example, in response to the mobile cart 116 arriving at a designated location in the delivery vehicle 104. In some implementations, for instance, the loading coordination engine 804 may signal a cart loading AGV 102b, delivery vehicle 104, component of the mobile cart 116, or computing device associated with a human. For instance, the signal may include instructions that the mobile cart 116 be secured in place, for example, using a cart lock mechanism, which may lock the wheels and/or couple the mobile cart 116 to the storage area 124 of the delivery vehicle 104.

In some implementations, once the mobile cart 116 is secured to the delivery vehicle 104, the loading coordination engine 804 may instruct one or more AGVs 102 to prepare and/or transport a subsequent mobile cart 116 to the same or a different delivery vehicle 104.

It should be noted that the method 400 described in reference to FIG. 4 is provided by way of reference and that the method 400 may be performed with additional or fewer steps or features.

Figure 5:
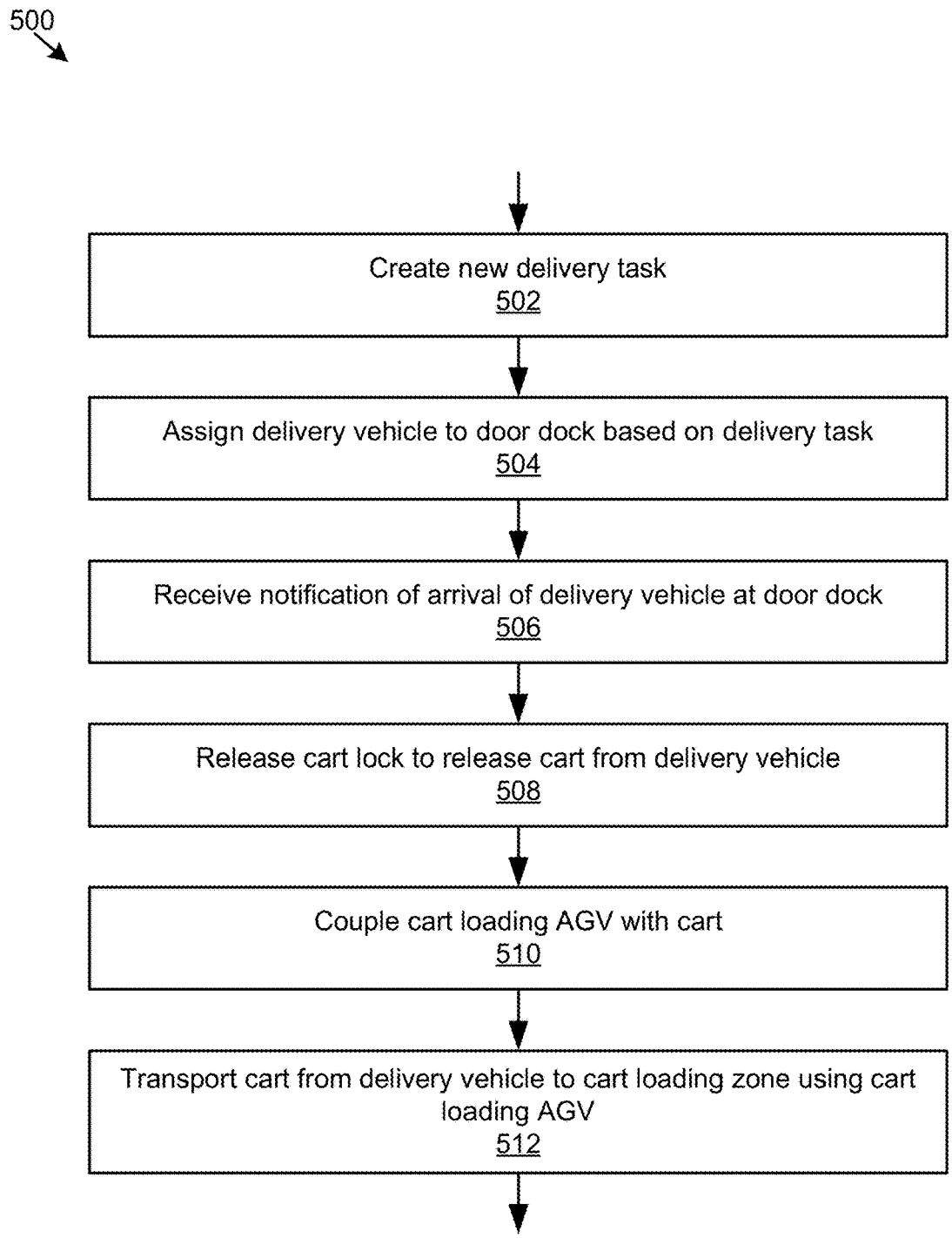
FIG. 5 is a flowchart of an example method for preparing a mobile cart for receiving items using automated guided vehicles.

FIG. 5 is a flowchart of an example method 500 for preparing a mobile cart 116 for receiving items using automated guided vehicles. For instance, the method 500 may prepare a delivery vehicle 104 and/or mobile cart 116 in a delivery vehicle 104 to receive items in orders.

In some implementations, at 502, the loading coordination engine 804 may create a new delivery task. For example, one or more orders including items may be inducted into the loading coordination system 800, as described in further detail above. In some implementations, a delivery task may include one or more items, orders, mobile carts 116, delivery routes, etc., that may be assigned to the delivery vehicle 104 or to which the delivery vehicle 104 may be assigned or otherwise associated.

In some implementations, at 504, the loading coordination engine 804 may assign a delivery vehicle 104 to a door dock 110 (e.g., at a loading facility) or a door dock 110 to the delivery vehicle 104 based on the delivery task. A door dock 110 may be assigned based on availability of door docks 110, proximity of a door dock 110 to items (e.g., in a storage area of a fulfillment center) assigned to the delivery vehicle 104, a previously prepared mobile cart 116 assigned to the delivery vehicle 104, or other criteria.

In some implementations, at 506, the loading coordination engine 804 may receive notification message of arrival of the delivery vehicle 104 at the door dock 110. For instance, a computing system of the delivery vehicle 104 may transmit a GPS coordinate, a notification message, or other signal to the loading coordination engine 804 indicating that the delivery vehicle 104 has arrived or is arriving at the door dock 110. In some implementations, the signal may be transmitted in response to a door of the delivery vehicle 104 opening.

In some implementation, at 508, the loading coordination engine 804 may release a cart lock to release the mobile cart 116 from the delivery vehicle 104. For example, the loading coordination engine 804 may transmit an instruction to release a cart lock, which is configured to secure the mobile cart 116 to the delivery vehicle 104. In some implementations, the instruction may be received by a computing device coupled with an electronically actuatable cart lock. For instance, a computing device of a delivery vehicle 104 or mobile cart 116 may actuate the cart lock to release it. In some implementations, the instruction may be received by a controller of a cart loading AGV 102b, which may navigate the cart loading AGV 102b into the delivery vehicle 104 and release the cart lock.

In some implementations, at 510, the loading coordination engine 804 may couple a cart loading AGV 102b with the mobile cart 116. For instance, the loading coordination engine 804 may instruct a controller of the cart loading AGV 102b to navigate the cart loading AGV 102b into the storage area 124 of the delivery vehicle 104 via the door dock 110 and couple with the mobile cart 116.

In some implementations, at 512, the loading coordination engine 804 may transport the mobile cart 116 from the delivery vehicle 104 to a cart loading zone 132 (assigned) using the cart loading AGV 102b. For instance, the loading coordination engine 804 may transmit an instruction to the controller of the cart loading AGV 102b to navigate the cart loading AGV 102b along a given route and/or to a defined location. For instance, the cart loading AGV 102b may navigate, transporting the mobile cart 116, out from the delivery vehicle 104 to a cart loading zone 132, which the loading coordination engine 804 may locate based on the door dock 110 assignment.

Figure 6A:
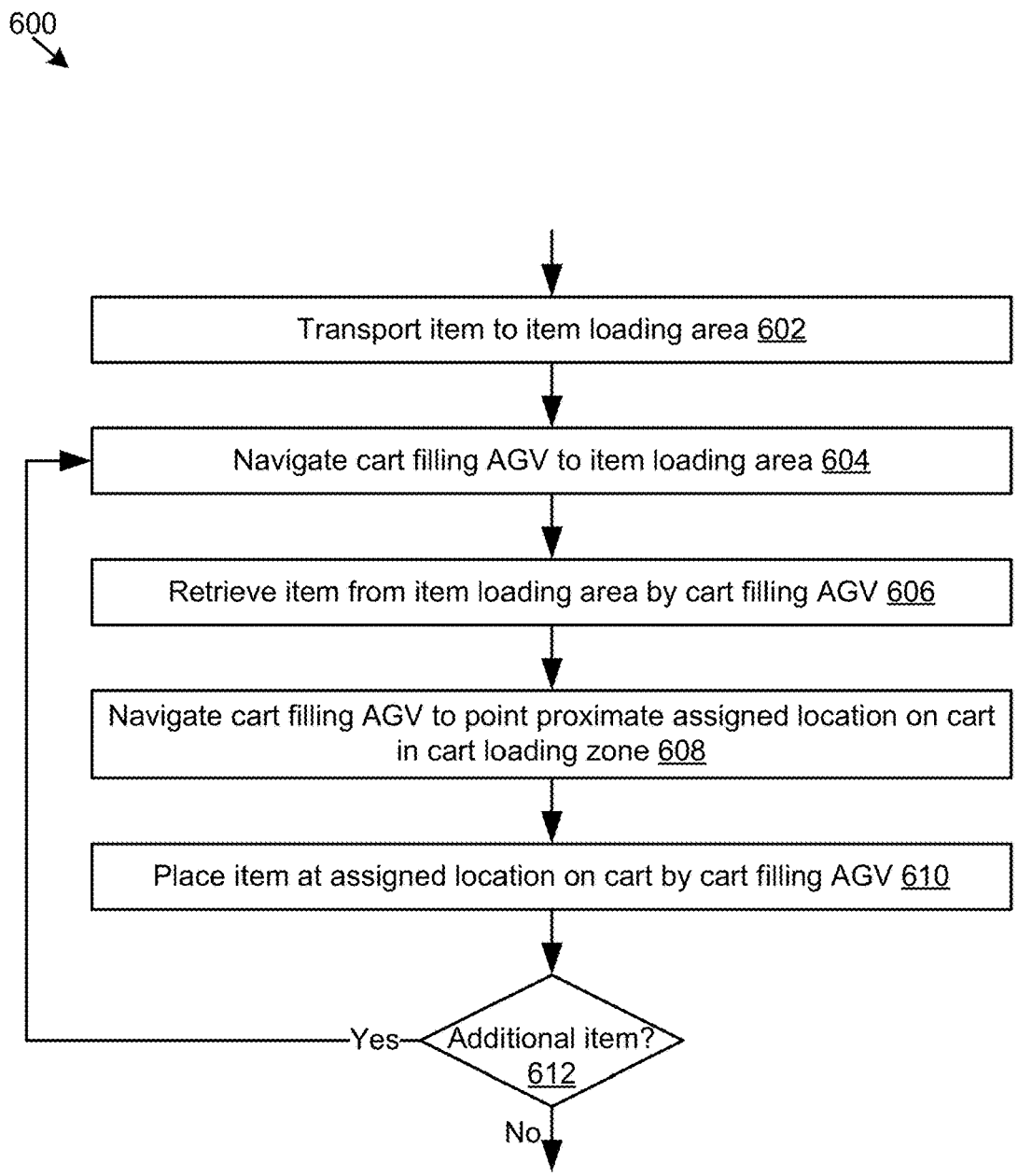
FIGS. 6A and 6B are flowcharts of an example method for coordinating automated guided vehicles to automatically load delivery vehicles.
Figure 6B:
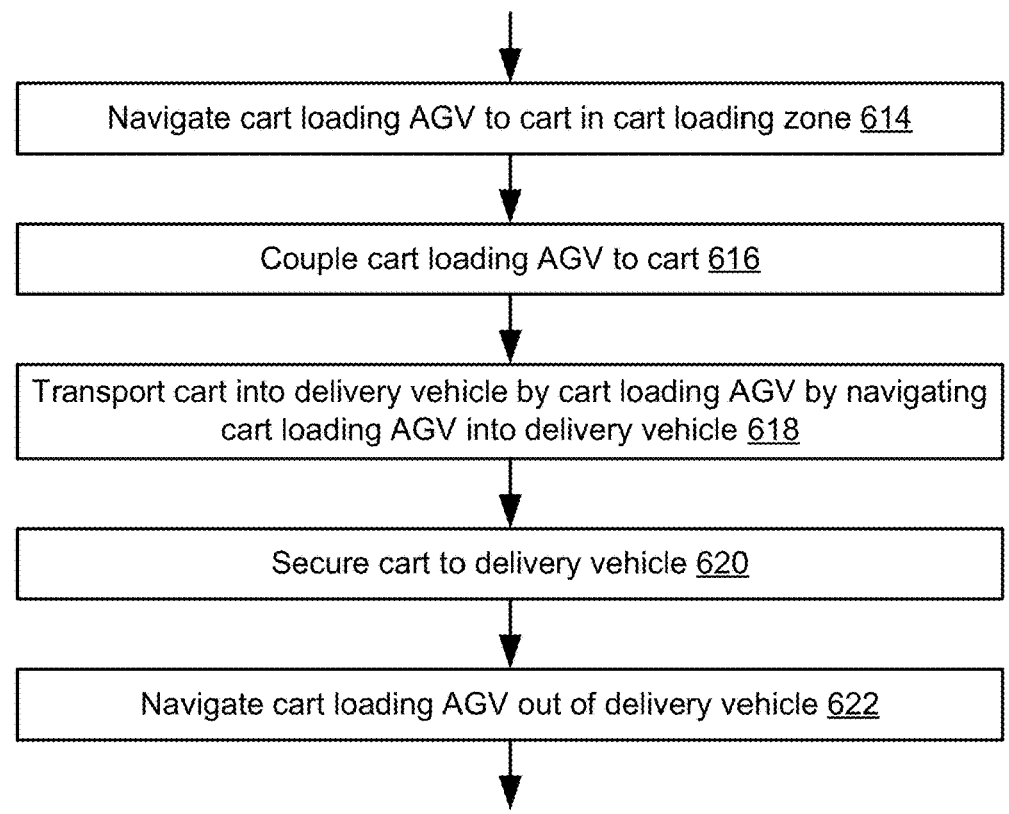

FIGS. 6A and 6B are flowcharts of an example method 600 for coordinating automated guided vehicles to automatically load delivery vehicles 104. The operations of the example method 600 are provided by way of example and other operations and mechanisms are possible and contemplated herein. In some instances, a loading coordination engine 804 or software on a controller of the cart filling AGV 102a may direct the cart filling AGV 102a to perform some or all of the operations described in reference to FIG. 6A. Similarly, a loading coordination engine 804 or software on a controller of the cart loading AGV 102b may direct the cart loading AGV 102b to perform some or all of the operations described in reference to FIG. 6B.

In some implementations, at 602, the loading coordination engine 804 may instruct a component of the loading coordination system 800 to deliver the first item to a loading area (e.g., at a door dock 110, cart loading zone 132, etc., associated with the delivery vehicle 104). For instance, the loading coordination engine 804 may issue an instruction to a conveyor mechanism 108, AGV 102, or a warehouse sorting mechanism. For example, an outbound warehouse system (which may include a human worker, AGV 102, conveyor mechanism(s) 108, etc.) may place an item on a conveyor mechanism 108 or an AGV 102 that may bring the item to the loading area associated with the delivery vehicle 104 and/or mobile cart 116. In some implementations, a conveyor mechanism 108 may include sorting mechanisms associated with door docks 110, which may be used to transport items to the specific door docks 110.

In some implementations, the loading coordination engine 804 may transmit instructions to a conveyor mechanism 108, an AGV 102, or a computing device of a human worker, which instructions may indicate to transport a particular item to a given location (e.g., a particular door dock 110, loading area, AGV 102, etc.) at a defined time or in response to a defined trigger (e.g., an item arriving at a defined location on the conveyor mechanism 108, the AGV 102 arriving at the loading area, etc.).

At 604, the loading coordination engine 804 may navigate (and/or issue instruction(s) to navigate) the AGV 102 (e.g., a cart filling AGV 102a) to a loading area to retrieve the first item from the loading area, which may be located on or adjacent to a conveyor mechanism 108, in the loading bay 106, or otherwise in a fulfillment center at which the cart loading zone 132 is located. In some implementations, the AGV 102 may follow a track, series of guidance system markers (e.g., QR codes, RFID tags, etc.), laser navigation points, etc., to navigate between its current location and the loading area. For example, a guidance system of the AGV 102 may read guidance system/navigation markers and follow them until a destination defined by the loading coordination engine 804 is reached. In some instances, the AGV 102 may stop adjacent to the location in order for the IHM 216 of the carrying device 226 to lift the item from the loading area.

In some implementations, at 606, the AGV 102 (e.g., the cart filling AGV 102a) may retrieve the item from the item loading area. For instance, the loading coordination engine 804 may instruct a controller of the AGV 102 to retrieve the item. In some implementations, the AGV 102 may articulate the IHM 216 to grasp, slide under, lift, or otherwise move the item onto the carrying device 226 and/or a shelf 214 of the AGV 102.

In some implementations, an AGV 102 may be fed by a conveyor mechanism 108, human worker, or another AGV 102, etc. For example, the loading coordination engine 804 may instruct an AGV 102 to retrieve an item from a loading area at the end, or another part, of a conveyor mechanism 108 at a given time or in response to a defined trigger (e.g., an item passing a given point on a conveyor belt, reaching the end of a conveyor belt, etc.). In some instances, the loading coordination engine 804 may instruct the AGV 102 to wait at the loading area for a conveyor mechanism 108, human worker, or another AGV 102 to place the item on a carrying device 226 of the AGV 102.

In some implementations, where the cart filling AGV 102a includes multiple shelves 214 where items may be stored (e.g., as in the AGV 202b described in reference to FIG. 2C), the IHM of the AGV 102 may retrieve multiple items from the loading area and place them on one or more AGV shelves 214.

At 608, the loading coordination engine 804 may instruct a controller of the AGV 102 to navigate the AGV 102 with the item to a point proximate to the assigned location on the mobile cart 116, for instance, when the mobile cart 116 is in the cart loading zone 132. For example, the loading coordination engine 804 (and/or another component of the loading coordination system 800) may determine the point proximate to the assigned location on the mobile cart 116 based on a location of the mobile cart 116, a location of the cart loading zone 132, the assigned location of the item on the mobile cart 116, and/or a range of motion of an IHM 216 of the cart filling AGV 102a. For instance, after retrieving the item from the loading area, the AGV 102 may transport the item to the assigned location. For example, the AGV 102 may navigate to a point/location adjacent to the assigned location of the item such that the IHM 216 of the AGV 102 may place the item at the assigned location. For example, a point proximate to the assigned location may be a position that is within the range of movement of the IHM 216 to place the item at the assigned location or on a shelf where the assigned location is found. The proximate point may be at a defined offset to the assigned location of the item or to a shelf on which the assigned location is found, for example, based on the range of motion of the IHM 216.

In some implementations, the autonomous navigation may be performed according to routing instructions in the task list. In some instances, the task list may include the assigned location of the item and the AGV 102 may automatically navigate, for example, by following the guidance system markers to the assigned location. In some implementations, the loading coordination engine 804 may define the details of the navigation, such as the guidance system markers, directions, movements, etc., of the AGV 102, and provide the details to the AGV 102.

In some implementations, the guidance system may include an optical scanner on a body of the AGV 102 that reads visual markers (e.g., QR codes) on a floor of the operating environment. In some implementations, the guidance system may include laser-based guidance systems, such as LIDAR (light imaging, detection, and ranging). A controller of the AGV 102 may look the visual marker up in an accessible database, such as the map data 822.

At 610, the AGV 102 may place the item at the assigned location on the mobile cart 116. In some implementations, the loading coordination engine 804 (or a component thereof) may instruct a controller of the cart filling AGV 102a to perform specific movements to place the item at the assigned location, although controller logic on the AGV 102 may additionally or alternatively automatically perform these operations based on the assigned location received from the loading coordination engine 804.

In some implementations, placing the item at the assigned location based on the task list includes articulating an IHM 216 of the cart filling AGV 102a to a height matching a shelf of the mobile cart 116 at which the assigned location is located, and transferring the item from the IHM 216 to the shelf at the assigned location. For example, a controller of the AGV 102 may instruct the IHM 216, or a component thereof, to raise or lower the carrying device 226 vertically and, in some instances, move the carrying device 226 sideways, forwards, or rearwards relative to the direction of movement of the AGV 102 to place the item on a shelf of the mobile cart 116.

In some implementations, the IHM 216 may lift the carrying device 226, which in turn lifts the item vertically. The carrying device 226 may support the item directly by engaging with the item (e.g., sliding underneath the item, coupling to the sides or front of the item, etc.). For example, the AGV 102 may elevate the carrying device 226 to a height based on the height of the shelf on which the assigned location is located. For instance, the AGV 102 may raise the carrying device 226 toward the storage shelf and stop once a scanner (e.g., coupled with the IHM 216 or carrying device 226) of the AGV 102 detects a shelf marker (e.g., a barcode, QR code, etc.). For example, the AGV 102 may use a unique identification code of the marker scanned from the marker compared to instructions received from the loading coordination engine 804 to identify a shelf, depending on the implementation.

In some implementations, the AGV 102 may move the carrying device 226 toward the shelf to place an item on top of the shelf at the assigned location. For instance, the IHM 216 (e.g., using the elevator 208) may raise or lower the carrying device 226 to align it above a shelf and then extend the carrying device 226 toward the shelf to set the item on the shelf. For example, the IHM 216 may raise the carrying device 226 along at least a third axis (e.g., the vertical or Z axis) until the item is above a particular shelf on the mobile cart 116. The IHM 216 may then lower the carrying device 226 along at least the third axis to place the second item on the shelf. In some instances, the AGV 102 may disengage the carrying device 226 from the item once the item is resting on the shelf.

In some implementations, the carrying device 226 may extend into a shelf on the mobile cart 116 to push the item to appropriate depth to be at the assigned location or, for example, until the item hits the back of a shelf or an item behind it on the shelf.

In some implementations, at 612, the loading coordination engine 804 may determine whether there is an additional item to be placed on the mobile cart 116 (e.g., based on the task list). If there is an additional item, the method 600 may return to 604 to retrieve another item from the loading area. In some implementations, where the cart filling AGV 102a includes multiple shelves 214 where items may be stored (e.g., as in the AGV 202b described in reference to FIG. 2B), the IHM 216 of the cart filling AGV 102a may retrieve an item from an AGV 102 shelf 214. In some implementations, if there are no additional items to be loaded to the mobile cart 116, the method 600 may continue to 614, as illustrated in FIG. 6B.

In some implementations, at 614, an AGV 102 (e.g., a cart loading AGV 102b) may navigate to the mobile cart 116 in the cart loading zone 132. For instance, the cart loading AGV 102b may navigate to the mobile cart 116 based on the task list and/or an instruction from the loading coordination engine 804. In some implementations, the mobile cart 116 may include a coupling point coupling mechanism corresponding to a coupling point 352 or mechanism on the cart loading AGV 102b. For instance, the cart loading AGV 102b may navigate to the cart loading zone 132 and align the cart loading AGV's 102b coupling point 352 or mechanism with the coupling point on the mobile cart 116. For example, the cart loading AGV 102b may navigate using a guidance system, location of the mobile cart 116 (e.g., stored in the map data 822, location assignment data 824, etc.), location of the cart loading zone 132, and/or computer vision, which may be described above in reference to the AGVs 102.

At 616, the AGV 102 may couple with the mobile cart 116, for example, based on the loading coordination engine 804 instructing a controller of the AGV 102 to couple with the mobile cart 116. In some implementations, the coupling mechanism of the cart loading AGV 102b may attach the cart loading AGV 102b to the coupling point of the mobile cart 116. In some implementations, the cart loading AGV 102b may lift the mobile cart 116, for example, if the mobile cart 116 does not have wheels or if the wheels of the mobile cart 116 are too small to allow it to roll over a dock plate and into a delivery vehicle 104. For instance, the cart loading AGV 102b may travel under the mobile cart 116 and, once under the mobile cart 116, may lift the mobile cart 116 off the ground.

At 618, the AGV 102 (e.g., a cart loading AGV 102b) may transport the mobile cart 116 into the delivery vehicle 104 by navigating into the delivery vehicle 104 while coupled with the mobile cart 116, for example, based on an instruction received by a controller of the AGV 102 from the loading coordination engine 804. In some implementations, navigating the cart loading AGV 102b with the mobile cart 116 using a guidance system of the cart loading AGV 102b includes applying motive force to the mobile cart 116 by the cart loading AGV 102b to transport the mobile cart 116 into the delivery vehicle 104 and following guidance system markers, operating environment coordinates, and/or physical attributes of the operating environment.

In some implementations, the mobile cart 116 may be assigned to a designated location in the delivery vehicle 104, and the cart loading AGV 102b may transport the mobile cart 116 to the designated location. In some instances, the delivery vehicle 104 (and/or mobile cart 116) may be configured to hold multiple mobile carts 116. For example, a mobile cart 116 may be configured or filled (e.g., as described in reference to FIGS. 6A and 7) such that one side of the mobile cart 116 is placed toward a walkway, toward a wall, etc., of the storage area 124 of the delivery vehicle 104, depending on the implementation.

In some implementations, at 620, the loading coordination engine 804 may secure the mobile cart 116 to the delivery vehicle 104. For example, securing the mobile cart 116 to the delivery vehicle 104 may include actuating a cart lock in response to an AGV 102 transporting the mobile cart 116 to a designated location in the delivery vehicle 104. In some instances, the loading coordination engine 804 may transmit an instruction to the cart loading AGV 102b, delivery vehicle 104 computer, computing device coupled with the cart lock, or another device based on or including a task in the task list instructing the mobile cart 116 to be secured to the delivery vehicle 104.

For example, the cart loading AGV 102b may receive the instruction and, in response, actuate a cart lock that secures the mobile cart 116 to the delivery vehicle 104. In some implementations, the cart loading AGV 102b may apply a torque, pressure, or other mechanical force to via an interface to lock or release the cart lock. In some implementations, the cart loading AGV 102b may provide an electrical current instructing or causing the cart lock to lock or release. For example, the cart loading AGV 102b may include a cart lock interface to secure the mobile cart 116 that receives power, whether electrical or mechanical, to trigger the cart lock. For instance, the cart lock may include a gear, pin, lever, clamp, etc., which may be actuated by a physical torque or other motive force provided by the cart loading AGV 102*b*, or delivery vehicle 104, among other potential components.

In some implementations, at 622, the cart loading AGV 102*b* may decouple from the mobile cart 116 and navigate out of the delivery vehicle 104. For example, the cart loading AGV 102*b* may use the guidance system(s) and operations described above to navigate from the delivery vehicle 104 to a waiting location, the cart loading zone 132, a subsequent mobile cart 116, or other location.

It should be noted that the method 600 of FIGS. 6A and 6B may have additional or fewer operations and may be performed with different components. Further, some or all of the operations may be repeated as appropriate and/or needed for any suitable number of items.

Figure 7:
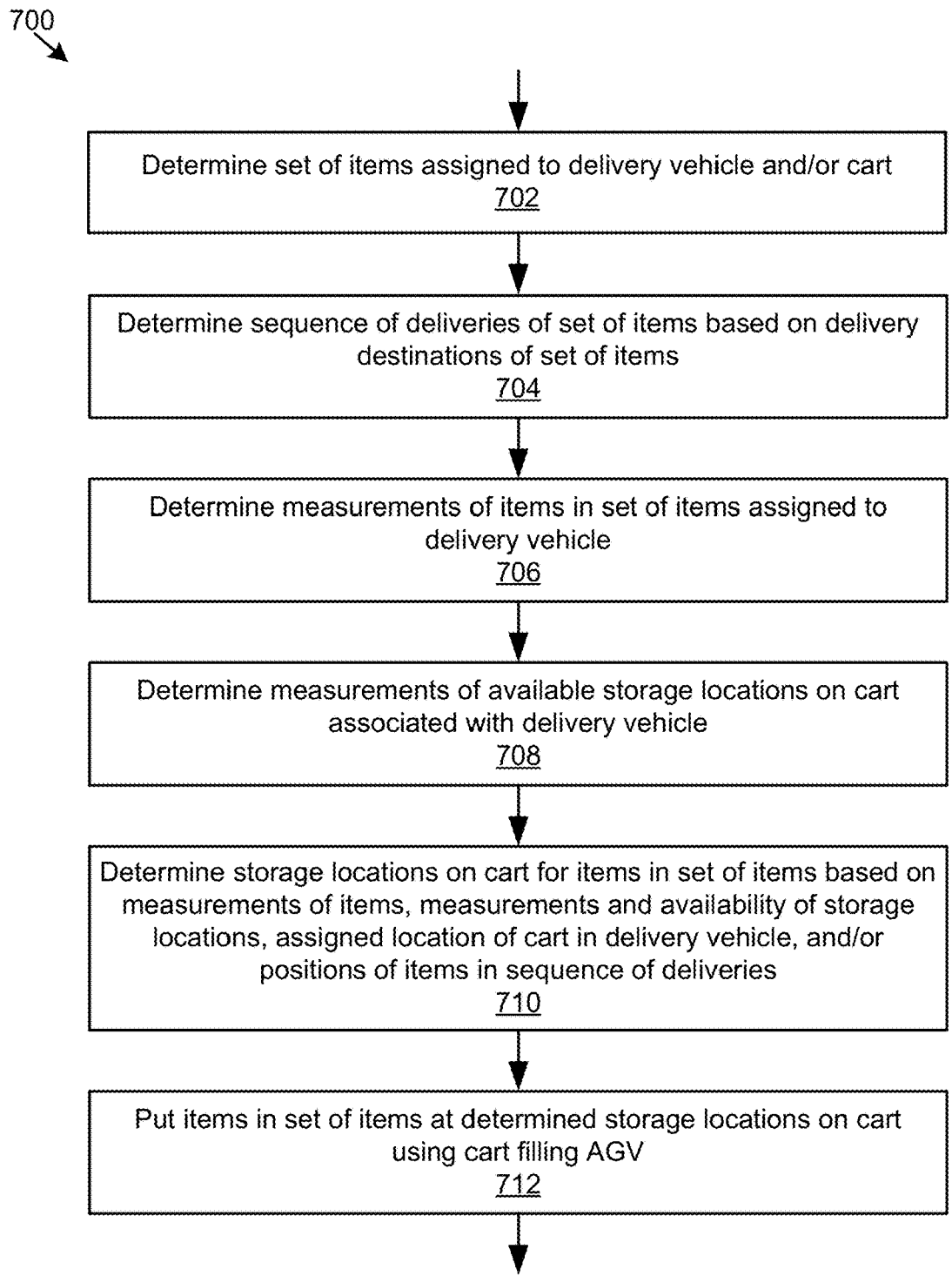
FIG. 7 is a flowchart of an example method for sorting items by an automated guided vehicle.

FIG. 7 is a flowchart of an example method 700 for sorting items to be loaded by an AGV 102 (e.g., a cart filling AGV 102*a*) onto a mobile cart 116. The method 700 may describe an inventory sorting algorithm to optimize the outbound process, for example, the AGV 102 may logically shuffle or arrange orders to prepare one or more mobile carts 116 in delivery vehicle 104, for example, for a sequence of deliveries.

At 702, the loading coordination engine 804 may determine a set of items assigned to a delivery vehicle 104 and/or mobile cart 116 associated with the delivery vehicle 104. For example, delivery vehicle 104 may have a given capacity, deliver to a defined geographic area, or otherwise have certain orders and/or items assigned to the delivery vehicle 104. For instance, a delivery vehicle 104 may have a geographic area assigned to it and the loading coordination engine 804 may assign orders with delivery destinations in that geographic area to the delivery vehicle 104. In some instances, assignment of the items to delivery vehicles 104 and/or mobile carts 116 may occur as items are delivered to the loading area (e.g., by the conveyor mechanism 108, as described above)

In some implementations, the loading coordination engine 804 may determine one or more mobile carts 116 in the delivery vehicle 104 or assigned to the delivery vehicle 104 and divide the set of items among the one or more mobile carts 116. In some implementations, the items may be further divided based on locations (e.g., a front or a back) on the mobile cart 116 to which items may be assigned or based on other criteria, as described below.

In some implementations, at 704, the loading coordination engine 804 may determine a sequence of deliveries of the set of items assigned to the delivery vehicle 104 (and/or mobile cart 116, depending on the implementation) based on delivery destinations of the set of items. For example, each item in the set of items may be associated with a delivery destination, which may be a geographic location. The sequence of deliveries may be determined based on a route through the delivery destinations. For instance, a mapping application may determine a route mapped through the delivery destinations of the set of items. In some implementations, the loading coordination engine 804 may determine a position in the sequence of deliveries for a delivery of a particular item assigned to the delivery vehicle 104.

It should be noted that an order may have one or more items (e.g., multiple boxes, multiple products, etc.) and a given delivery destination may have one or more orders. When a delivery destination has multiple items, the items at that destination may be sequenced based on the order to which they belong, the size or type of the items, arbitrarily, or the items may have occupy the same position in the sequence.

At 706, the loading coordination engine 804 may determine measurements of items in the set of items assigned to the delivery vehicle 104. In some implementations, the measurements stored in item data 830 that may be determined based on scanning or otherwise capturing a label of the item, for example. For example, the loading coordination engine 804 may look up item or order data 826 pertaining to the item in a database 820, where the dimensions and other attributes of the item may be stored. In some implementations, the measurements may be automatically determined using an optical scanner or other measurement method.

If the dimensions of an item exceeds a defined threshold size or weight. For example, if the item is a pallet 126 (e.g., as illustrated in FIG. 1) of products or a particularly large or heavy item, the item may be automatically assigned to a pallet location in the delivery vehicle 104 or marked as exceeding a threshold dimension. Such an item may be automatically flagged by the loading coordination engine 804 to be manually loaded by a human worker, for example.

At 708, the loading coordination engine 804 may determine measurements of available storage locations on one or more mobile carts 116 (e.g., a current mobile cart 116 being loaded, a set of mobile carts 116 associated with a delivery vehicle 104, etc.). For example, there may be a defined quantity and configuration of storage locations on shelves of a mobile cart 116, pallets, or in other locations in the delivery vehicle 104. A storage location may have a defined weight capacity, height, width, etc. In some implementations, an available storage location may be a subdivision of a shelf or other portion of a mobile cart 116 and may, for instance, have a variable size based on the quantity and size of items assigned to or already stored on the shelf and/or portion of a mobile cart 116. For example, an item with a particular depth (or other dimension) that is less than the amount of available space on a shelf on the mobile cart 116 may be assigned to the shelf, thereby decreasing the remaining amount of available space on the shelf to which an additional item may be assigned. For example, once the item is assigned to the available storage location, that storage location may be marked in a database as assigned to the item and the remaining available space on the shelf, portion of the mobile cart 116, or mobile cart 116 may be recalculated and left in the database 820 for future assignment to another item.

In some implementations, the loading coordination engine 804 may cube the dimensions of the item and the available storage location on the mobile cart 116 to facilitate assignment of the items to the mobile cart 116. Cubing the dimensions of an item or available space may include determining a cube having dimensions such that the item (e.g., for an irregularly shaped item) may fit in the cube or a cube that would fit in the available space. For instance, cubing may include generalizing an irregularly shaped space to be rectangular (e.g., as in a rectangular prism or cube).

In some implementations, delivery vehicles 104 and/or mobile carts 116 may vary in configuration. As such, in some instances, a loading coordination engine 804 may determine the number, size, location, and/or configuration of available storage locations on the particular mobile cart(s) 116 to which items may be assigned. These and other attributes may be linked with the particular delivery vehicle 104 in delivery vehicle data 832 or cart data 834 in an accessible database (e.g., the database 820 described in reference to FIG. 8), depending on the implementation.

At 710, the loading coordination engine 804 may determine and/or assign storage locations on the mobile cart 116 and/or in the delivery vehicle 104 for items in the set of items. For instance, the determination of the storage locations may be based on the measurements of the items, measurements and availability of storage locations in on the mobile cart 116, a location or orientation of the particular mobile cart 116 in the delivery vehicle 104, and/or positions of the items in the sequence of deliveries. In some implementations, the location assignments of items may be stored in a database 820.

In some implementations, the loading coordination engine 804 may use the location of a mobile cart 116 in a delivery vehicle 104 (or the location to which the mobile cart 116 is assigned, for example) to assign items to the mobile cart 116. For instance, a mobile cart 116 may have a first side and a second side where the first side will be placed against a wall and the second side placed away from the wall in the delivery vehicle 104. The loading coordination engine 804 may determine a location and/or orientation of the mobile cart 116, for example, the location and/or orientation of the mobile cart 116 may be assigned to the mobile cart 116, or determined based on the configuration of the mobile cart 116. For instance, a particular mobile cart 116 may be designed to have a particular orientation or location in the delivery vehicle 104 and the location and/or orientation may be stored to cart data 834 or determined by a sensor of the cart filling AGV 102a or cart loading AGV 102b, such as a camera, QR code reader, RFID tag reader, etc.

In some implementations (e.g., where multiple mobile carts 116 are assigned to a delivery vehicle 104), the sizes, shapes, and/or orientations of each mobile cart 116 may be different and the assigned locations may be determined and/or the mobile carts 116 may be filled and loaded into the delivery vehicle 104 based on the specific configuration of the mobile cart 116. For example, a mobile cart 116 may have a slope, or other mechanism, for moving items from a back side (e.g., to be placed toward a wall of the delivery vehicle 104) to a front side (e.g., to be placed toward a walkway or door of the delivery vehicle 104) of the mobile cart 116 to allow items to more easily loaded or unloaded from the mobile cart 116.

In some implementations, the loading coordination engine 804 may use a door of the delivery vehicle 104 to be used at delivery to assign the item to a location in the mobile cart 116. The loading coordination engine 804 may assign items near to the delivery door that will be used during delivery, so that items for a particular door may be near to the door. For instance, a delivery destination may have a delivery door associated therewith, and items may be assigned to a location of a mobile cart 116 near the door with the item/delivery destinations in the delivery vehicle 104, for example, based on an available location of a mobile cart 116 and the location at which the mobile cart 116 will be placed in the delivery vehicle 104. For example, at delivery, a rear door may be used with a door dock 110, a side door may be used for curbside delivery, a top door may be used with a delivery drone, etc.

In some implementations, the loading coordination engine 804 may assign the items to available shelving locations on the mobile cart 116 based on the dimensions of the items and of the available shelving locations. In some instances, items of a given weight may be matched to a shelf having a corresponding weight capacity range (e.g., a heavier duty and/or lower height shelf may hold heavier items). In some instances, some shelves may have a larger available space (e.g., the height above the shelf may be larger) than other shelves and items may be assigned according to their size. For example, an item may be assigned to the smallest shelf that has sufficient size for that item (although other criteria may also be applied to store the item on a larger shelf).

In some implementations, the loading coordination engine 804 may assign items to available locations based on the position of the delivery of the items in the sequence of deliveries. For example, the items may be assigned to depths or positions in a shelf on the mobile cart 116 in a reverse order of the sequence of deliveries. For example, the last-delivered items may be assigned to the back of a mobile cart 116 (e.g., on a given shelf) first, such that a front-most item on a given shelf would be retrieved from the shelf at delivery before items behind it on the shelf are retrieved during their respective deliveries.

In some implementations, the loading coordination engine 804 may use some, all, or different criteria to those described for sorting and assigning items to available locations. The methods for sorting and assigning may be performed in the order described or in another order. Further, it should be understood that other methods of sorting and assigning the items to locations in the delivery vehicle 104 may be used without departing from the scope of this disclosure and that other methods are possible and contemplated herein.

As an example, a set of items assigned to a delivery vehicle 104 (e.g., a particular route serviced by the delivery vehicle 104) may be divided among the mobile carts 116 associated with the delivery vehicle 104. The items may be sorted into groups based on delivery door, the items in the groups may be sorted into sub-groups based on size class of the items, and the items in sub-group may be sorted in a reverse order of delivery to place first delivered items at the front of shelves of the mobile cart 116 and later deliver items deeper in the shelves.

In some implementations, the items may be assigned one at a time to available locations in the delivery vehicle 104 using some, all, or different criteria than described above. For instance, items may be assigned one at a time if the sequence of deliveries or all items assigned to the mobile cart 116 are not yet known to the loading coordination engine 804 when assignment begins. For example, the loading coordination engine 804 may receive attributes of the item, such as the dimensions, delivery door, and delivery destination of the item, and, in response, the loading coordination engine 804 may assign the item to an available location on the mobile cart 116 and/or in the delivery vehicle 104 105 and instruct the AGV 102 to place the item at the assigned location, as described below.

In some implementations, the loading coordination engine 804 may use the data of those items already assigned to the delivery vehicle 104 to assign subsequent items to locations in the delivery vehicle 104. For example, the loading coordination engine 804 may assign an item to the smallest available location on the mobile cart 116 that would fit the item. The item may be assigned to a location in front of a previously assigned item with a later delivery based on the sequence of deliveries. The item may be assigned to a back of a new section of a mobile cart 116 if no item with a later delivery is assigned. In some implementations, the loading coordination engine 804 may assign items to available locations beginning near to the delivery door for the deliveries of the items and moving away from the delivery door, although other implementations are possible. It should be understood that other sorting criteria are also possible and contemplated herein. In some implementations, this, or a similar, process may be repeated for subsequent items assigned by the loading coordination engine 804.

At 712, the loading coordination engine 804 may put the items in the set of items at the determined storage locations on the mobile cart 116 using the cart filling AGV 102a. For example, the loading coordination engine 804 may instruct a cart filling AGV 102a to transport the item to an assigned location and place the item at the assigned location, such as is described above in reference to FIG. 6A.

FIG. 8 is a block diagram of an example loading coordination system 800 and data communication flow for automated loading of mobile carts 116 and delivery vehicles 104 using AGVs 102. The system 800 may include a loading coordination server 802, one or more AGVs 102, one or more delivery vehicles 104, a database 820, and/or warehouse equipment 810.

The components of the system 800 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth™ etc.), etc.

The loading coordination server 802 may, in some implementations, include one or more hardware and/or virtual servers programmed to perform the operations, acts, and/or functionality described herein. The components of the loading coordination server 802 may comprise software routines storable in one or more non-transitory memory devices and executable by one or more computer processors of the loading coordination server 802 to carry out the operations, acts, and/or functionality described herein. In further implementations, these routines, or a portion thereof, may be embodied in electrical hardware that is operable to carry out the operations, acts, and/or functionality described herein.

In some implementations, the loading coordination server 802, or elements thereof, may be integrated with or communicatively coupled with a plurality of AGVs 102. The loading coordination server 802 may include hardware and software configured to dispatch the AGVs 102, and is coupled for communication the other components of the system 800 to receive and provide data. In some instances, the loading coordination server 802 may calculate a route to execute tasks considering traffic and resources. In some cases it adjusts the route or the task in order to keep the route optimum. In some implementations, the loading coordination server 802 may generate a schedule that defines the route and other operations for AGVs 102, as described herein. For instance, the loading coordination server 802 may instruct AGVs 102 to navigate within a distribution facility, loading bay 106, or delivery vehicle 104 according to the schedule. The schedule of a plurality of the AGVs 102 may be coordinated such that an optimal flow can be achieved.

The loading coordination engine 804 may comprise software routines storable in one or more non-transitory memory devices and executable by one or more computer processors to carry out the operations, acts, and/or functionality described herein. In further implementations, these routines, or a portion thereof, may be embodied in electrical hardware that is operable to carry out the operations, acts, and/or functionality described herein. Instances of the loading coordination engine 804a, 804b, . . . 804n may be executed by one or more of the components of the system 800. The loading coordination engine 804 may be operable on the loading coordination server 802 (or another component of the system 800) and communicatively coupled to receive data from and transmit data to other components of the system 800, as described elsewhere herein. In some implementations, the loading coordination engine 804 may be configured to store, retrieve, and/or maintain data in the database 820. In some implementations, the components, features, or functionality of the loading coordination engine 804 may be distributed among two or more components of the system 800, for example.

The database 820 is an information source for storing and providing access to data. The data stored by the database 820 may be organized and queried using various criteria including any type of data stored by it. The database 820 may include data tables, databases, or other organized collections of data. Examples of the types of data stored by the database 820 may include, but are not limited to map data 822, AGV data 828, location assignment data 824, order data 826, item data 830, vehicle data 832, cart data 834, etc. In some instances, the database 820 may also include conveyor system attributes, delivery destination attributes, sensor data, etc.

The database 820 may be included in the loading coordination server 802, or in another computing system and/or storage system distinct from but coupled to or accessible by components of the system 800 to store, retrieve, or maintain data in the database 820. In some implementations, the database 820 may be stored in a data store 908, as described in reference to FIG. 9. The database 820 can include one or more non-transitory computer-readable mediums for storing the data. In some implementations, the database 820 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 822 may include data reflecting the 2 or 3 dimensional layout of zones, such as a facility, loading area, loading bay 106, cart loading zone 132, and/or delivery vehicle 104, for example. In some instances, the map data 822 may include geographic map data, such as delivery areas and routes for delivery vehicles 104. The map data 822 may include data about guidance system markers, such as unique identification codes of the markers and positions of the markers in the layout of the facility or AGV 102 operating environment, loading bay 106, or delivery vehicle 104.

The location assignment data 824 may include data representing available locations on a mobile cart 116 and/or a delivery vehicle 104 that may be assigned to items, such as what locations are available, the dimensions, capacities, 2 or 3 dimensional locations, etc., for example. The location assignment data may also include shelf specific information, such as the height, width, depth, weight capacity, shelf identifier, or other information about shelves on a mobile cart 116 or other location, although this information may be alternatively or additionally stored in cart data 834. In some instances, the location assignment data 824 may also include whether and which items are assigned to and/or currently stored in the locations in a particular delivery vehicle 104.

The order data 826 may include data about orders, the quantity and identity of items in orders, delivery destination (e.g., a shipping address) information for orders, customer account information, order priority, progress of order fulfillment, number of cartons in an order, etc.

The AGV 102 data 828 may describe the state of an AGV 102 (operational state, health, location, battery life, storage capacity, items being carried, etc.), whether and to which delivery vehicle 104 it is assigned, type of AGV 102, components of AGV 102, etc.

Item data 830 may describe unique identifiers for items, the location of the items, other attributes of the item (e.g., size, description, weight, quantity of items in a package, color, etc.), item inventory, mapping of items to locations in mobile carts 116, item label or marker information, etc.

Vehicle data 832 may represent identification codes identifying specific delivery vehicles 104; routes, items, AGVs 102 associated with delivery vehicles 104, available locations, door docks 110, etc. In some implementations, the vehicle data 832 may include attributes of the delivery vehicle 104, such as its location, acceleration, number and configuration of doors, placement of cart lock mechanism(s), number and configuration of shelves or other storage locations in the delivery vehicle 104, etc.

Cart data 832 may represent identification codes identifying specific mobile carts 116, items associated with mobile carts 116, available or assigned locations in mobile carts 116, or other information about mobile carts 116, such as their configuration, location, association with AGVs 102 or delivery vehicles 104, shelf heights, weight capacities, etc.

An AGV 102A . . . 102N is an automated guided vehicle or robot that may be configured to autonomously transport items, as described in detail above in reference to FIGS. 1-3. An AGV 102 may include a computing system (e.g., as in the example provided in FIG. 9) with communication and processing capabilities. For example, the AGV 102 may run the loading coordination engine 804 or a component thereof. In some implementations, AGVs 102 may be differentiated into different types having varying duties, such as the cart filling AGV 102*a* and cart loading AGV 102*b* described above.

A delivery vehicle 104A . . . 104N may include a computing system that may communicate with other components of the loading coordination system 800 and may, in some instances, perform some operations described in reference to the loading coordination engine 804. For example, a computing system of a delivery vehicle 104 may include the loading coordination engine 804 or a component thereof. In some implementations, the computing system of the delivery vehicle 104 may transmit information to an AGV 102 associated with the delivery vehicle 104, as described above.

The loading coordination server 802 may be coupled with equipment 810, such as a conveyor mechanism 108 (e.g., conveyor controls, conveyor scanners, conveyors, automated induction equipment, other warehouse equipment, etc.), described herein.

Figure 9:
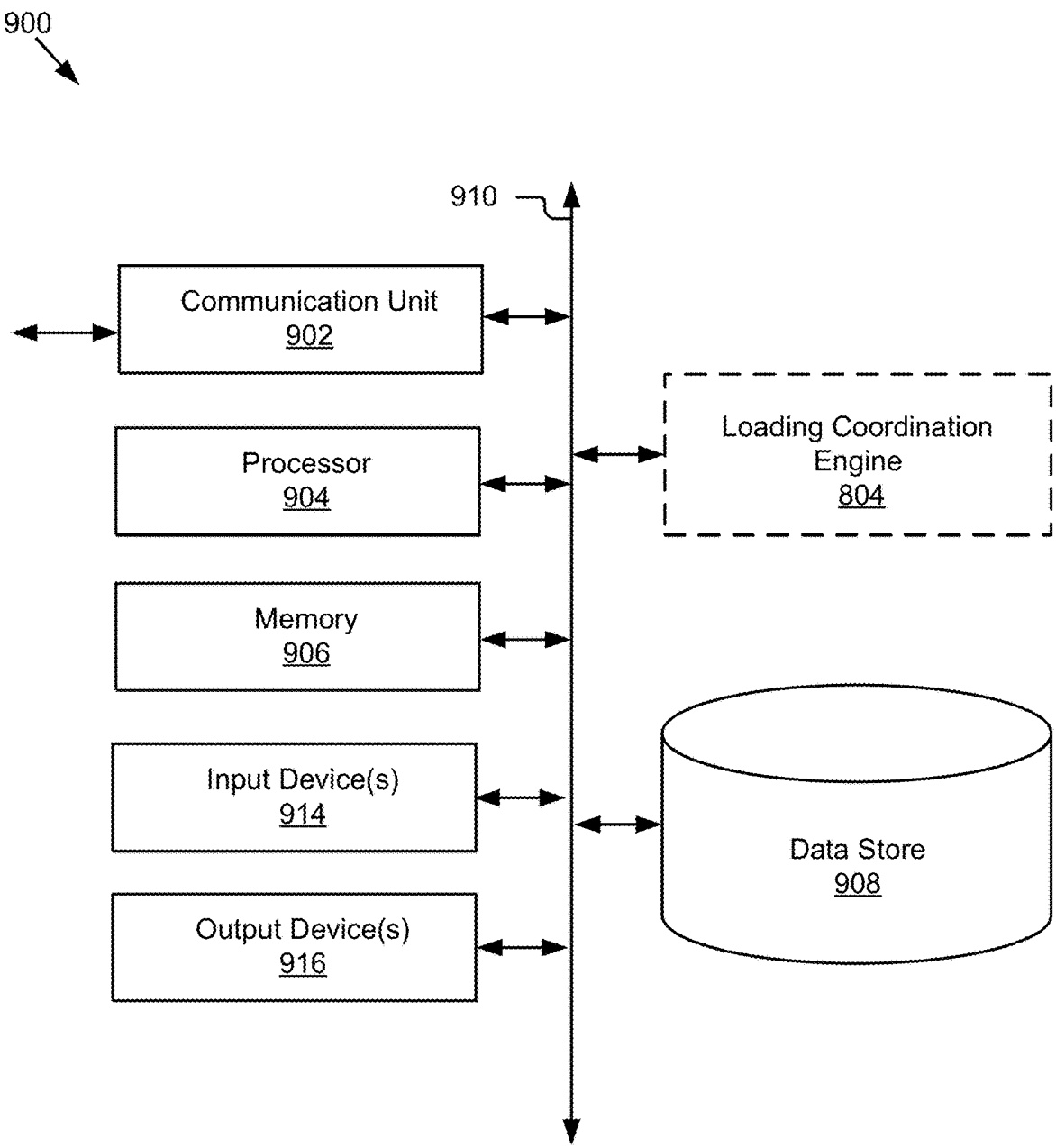
FIG. 9 is a block diagram of an example computing system.

FIG. 9 is a block diagram of an example computing system 900. This computing system 900 may represent the computer architecture of loading coordination server 802, AGV 102, or delivery vehicle 104, as depicted in FIG. 8, and may include different components depending on the implementation being represented.

As depicted in FIG. 9, the computing system 900 may include a loading coordination engine 804, depending on the configuration. In some implementations, the computing system 900 may store and/or operate other software that may be configured to interact with the loading coordination engine 804 via a communication unit 902.

The loading coordination engine 804 may include software including logic executable by the processor 904 to perform its respective operations described herein, although in further implementations the loading coordination engine 804 may be implemented in hardware (one or more application specific integrated circuits (ASICs) coupled to the bus 910 for cooperation and communication with the other components of the system 900; sets of instructions stored in one or more discrete memory devices (e.g., a PROM, FPROM, ROM) that are coupled to the bus 910 for cooperation and communication with the other components of the system 900; a combination thereof; etc.).

As depicted, the computing system 900 may include a processor 904, a memory 906, a communication unit 902, an output device 916, an input device 914, and data store(s) 908, which may be communicatively coupled by a communication bus 910. The computing system 900 depicted in FIG. 9 is provided by way of example and it should be understood that it may take other forms and include additional or fewer components without departing from the scope of the present disclosure. For instance, various components of the computing system(s) may be coupled for communication using a variety of communication protocols and/or technologies including, for instance, communication buses, software communication mechanisms, computer networks, etc. While not shown, the computing system 900 may include various operating systems, sensors, additional processors, and other physical configurations. Although, for purposes of clarity, FIG. 9 only shows a single processor 904, memory 906, communication unit 902, etc., it should be understood that the computing system 900 may include a plurality of one or more of these components.

The processor 904 may execute software instructions by performing various input, logical, and/or mathematical operations. The processor 904 may have various computing architectures to process data signals including, for example, a complex instruction set computer (CISC) architecture, a reduced instruction set computer (RISC) architecture, and/or an architecture implementing a combination of instruction sets. The processor 904 may be physical and/or virtual, and may include a single core or plurality of processing units and/or cores. In some implementations, the processor 904 may be capable of generating and providing electronic display signals to a display device, supporting the display of images, capturing and transmitting images, performing complex tasks including various types of feature extraction and sampling, etc. In some implementations, the processor 904 may be coupled to the memory 906 via the bus 910 to access data and instructions therefrom and store data therein. The bus 910 may couple the processor 904 to the other components of the computing system 900 including, for example, the memory 906, the communication unit 902, the input device 914, the output device 916, and the data store(s) 908.

The memory 906 may store and provide access to data to the other components of the computing system 900. The memory 906 may be included in a single computing device or a plurality of computing devices. In some implementations, the memory 906 may store instructions and/or data that may be executed by the processor 904. For example, the memory 906 may store a loading coordination engine 804 and its respective components, depending on the configuration. The memory 906 is also capable of storing other instructions and data, including, for example, an operating system, hardware drivers, other software applications, databases, etc. The memory 906 may be coupled to the bus 910 for communication with the processor 904 and the other components of computing system 900.

The memory 906 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 904. In some implementations, the memory 906 may include one or more of volatile memory and non-volatile memory (e.g., RAM, ROM, hard disk, optical disk, etc.). It should be understood that the memory 906 may be a single device or may include multiple types of devices and configurations.

The bus 910 can include a communication bus for transferring data between components of a computing system or between computing systems, a network bus system including a computer or portions thereof, a processor mesh, a combination thereof, etc. In some implementations, the various components operating on the computing system 900 (operating systems, device drivers, etc.) may cooperate and communicate via a communication mechanism included in or implemented in association with the bus 910. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 902 may include one or more interface devices (I/F) for wired and wireless connectivity among the components of the system 800. For instance, the communication unit 902 may include various types known connectivity and interface options. The communication unit 902 may be coupled to the other components of the computing system 900 via the bus 910. The communication unit 902 may be electronically communicatively coupled to a network or other components of the system 800 (e.g., by wire, wirelessly, etc.). In some implementations, the communication unit 902 can link the processor 904 to a computer network, which may in turn be coupled to other processing systems. The communication unit 902 can provide other connections to other entities of the system 800 using various standard communication protocols.

The input device 914 may include any device for inputting information into the computing system 900. In some implementations, the input device 914 may include one or more peripheral devices. For example, the input device 914 may include a keyboard, a pointing device, microphone, an image/video capture device (e.g., camera), a touch-screen display integrated with the output device 916, etc.

The output device 916 may be any device capable of outputting information from the computing system 900. The output device 916 may include one or more of a display (LCD, OLED, etc.), a printer, a haptic device, audio reproduction device, touch-screen display, etc. In some implementations, the output device is a display which may display electronic images and data output by the computing system 900 for presentation to a user. In some implementations, the computing system 900 may include a graphics adapter (not shown) for rendering and outputting the images and data for presentation on output device 916. The graphics adapter (not shown) may be a separate processing device including a separate processor and memory (not shown) or may be integrated with the processor 904 and memory 906.

The data store(s) are information source(s) for storing and providing access to data, such as the database 820 and/or data described in reference to the database 820. The data stored by the data store(s) 908 may organized and queried using various criteria including any type of data stored by them, such as the data described in reference to the database 820 in FIG. 8. The data store(s) 908 may include file systems, data tables, documents, databases, or other organized collections of data.

The data store(s) 908 may be included in the computing system 900 or in another computing system and/or storage system distinct from but coupled to or accessible by the computing system 900. The data store(s) 908 can include one or more non-transitory computer-readable mediums for storing the data. In some implementations, the data store(s) 908 may be incorporated with the memory 906 or may be distinct therefrom. In some implementations, the data store(s) 908 may store data associated with a database management system (DBMS) operable on the computing system 900. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
assigning, by a loading coordination engine, a location on a mobile cart to an item;
generating, by the loading coordination engine, a task list including a first instruction to a first automated guided vehicle ("AGV") to position the item on the mobile cart based on the assigned location and a second instruction to a second AGV to transport the mobile cart into a delivery vehicle, the second AGV being adapted to move multiple mobile carts into the delivery vehicle, each of the mobile carts having multiple shelves adapted to hold items, the delivery vehicle being adapted to simultaneously hold the multiple mobile carts;
instructing, by the loading coordination engine, a controller of the first AGV carrying the item to navigate the first AGV from an item loading area to a point proximate to the assigned location on the mobile cart;
responsive to determining that the first AGV has reached the point proximate to the assigned location on the mobile cart, instructing, by the loading coordination engine, the controller of the first AGV to place the item at the assigned location based on the task list; and
instructing, by the loading coordination engine, a controller of the second AGV coupled with the mobile cart to navigate the mobile cart from a cart loading zone into a securable position in the delivery vehicle with a previously-placed mobile cart based on the task list.

2. The method of claim 1, further comprising:
generating, by the loading coordination engine, a delivery task;
assigning, by the loading coordination engine; the delivery vehicle to a door dock at a loading facility based on the delivery task; and
instructing, by the loading coordination engine, the second AGV coupled with the mobile cart to navigate from the delivery vehicle to the cart loading zone associated with the door dock, the cart loading zone being determined based on the assignment of the door dock.

3. The method of claim 2, further comprising:
receiving, by the loading coordination engine, a notification message indicating arrival of the delivery vehicle at the door dock;
transmitting, by the loading coordination engine, an instruction to release a cart lock, the cart lock configured to secure the mobile cart to the delivery vehicle;
instructing, by the loading coordination engine, the controller of the second AGV to couple the second AGV with the mobile cart; and
instructing, by the loading coordination engine, the controller of the second AGV to navigate the second AGV from the delivery vehicle to the cart loading zone.

4. The method of claim 1, wherein instructing the controller of the first AGV carrying the item to navigate the first AGV from an item loading area to the point proximate to the assigned location on the mobile cart includes
instructing, by the loading coordination engine, the controller of the first AGV to navigate the first AGV to the item loading area,
instructing, by the loading coordination engine, the controller of the first AGV to retrieve, by the first AGV, the item from the item loading area,
determining, by the loading coordination engine, the point proximate to the assigned location on the mobile cart based on a location of the mobile cart, the assigned location, and a range of motion of an item handling mechanism of the first AGV, and
instructing, by the loading coordination engine, the controller of the first AGV to navigate the first AGV to the point proximate to the assigned location on the mobile cart in the cart loading zone.

5. The method of claim 1, wherein instructing the controller of the first AGV to place the item and the assigned location based on the task list includes instructing the controller of the first AGV to articulate an item handling mechanism of the first AGV to a height matching a shelf of the mobile cart at which the assigned location is located, and transfer the item from the item handling mechanism to the shelf at the assigned location.

6. The method of claim 1, wherein instructing the controller of the second AGV coupled with the mobile cart to navigate the mobile cart from the cart loading zone into the securable position in the delivery vehicle based on the task list includes
instructing the controller of the second AGV to navigate the second AGV to the cart loading zone,
instructing the controller of the second AGV to couple the second AGV with the mobile cart in the cart loading zone, and
instructing the controller of the second AGV to apply motive force to the mobile cart by the second AGV using a guidance system of the second AGV to transport the mobile cart into the delivery vehicle.

7. The method of claim 1, further comprising: responsive to determining that the mobile cart has arrived at the securable position in the delivery vehicle, instructing, by the loading coordination engine, the controller of the second AGV to secure the mobile cart to the delivery vehicle by actuating a cart lock.

8. The method of claim 1, wherein the first AGV includes a first drive unit that provides motive force to the first AGV, a first guidance system that locates the first AGV in an operating environment, and an item handling mechanism adapted to move items.

9. The method of claim 8, wherein the second AGV includes a second drive unit that provides motive force to the second AGV, a second guidance system that locates the second AGV in the operating environment, and a cart coupling mechanism that couples the second AGV with the mobile cart.

10. The method of claim 1, further comprising:
receiving data describing a label captured by a scanner communicatively coupled with the loading coordination engine;
determining, by the loading coordination engine, a delivery destination of the item based on the data describing the label; and
assigning, by the loading coordination engine, the item to the location on the mobile cart based on the delivery destination of the item.

11. The method of claim 1, comprising:
assigning, by the loading coordination engine, the item to a door dock associated with the delivery vehicle based on a delivery destination of the item; and
instructing, by the loading coordination engine, a conveyor mechanism to transport the item to the door dock associated with the delivery vehicle.

12. The method of claim 1, wherein assigning the item to the location on the mobile cart includes
determining one or more measurements of the item,
determining one or more measurements of available storage locations on the mobile cart,
determining a position of a delivery of the item in a sequence of deliveries of a set of items assigned to the delivery vehicle, and
determining the assigned location of the item based on the one or more measurements of the item, the one or more measurements of the available storage locations on the mobile cart, and the position of the delivery of the item in the sequence of deliveries.

13. A system comprising:
a first automated guided vehicle ("AGV");
a second AGV;
a delivery vehicle adapted to simultaneously hold multiple mobile carts, each of the multiple mobile carts having multiple shelves adapted to hold items; and
a computing system including one or more processors and a memory storing instructions that, when executed by the one or more processors, cause the system to:
assign a location on a mobile cart to an item;
generate a task list including a first instruction to the first AGV to position the item on the mobile cart based on the assigned location and a second instruction to the second AGV to transport the mobile cart into the delivery vehicle, the task list including moving the multiple mobile carts into the delivery vehicle by the second AGV;
transport, by the first AGV, the item from an item loading area to a point proximate to the assigned location on the mobile cart;
place, by the first AGV, the item at the assigned location based on the task list; and
transport, by the second AGV, the mobile cart from a cart loading zone into a securable position in the delivery vehicle based on the task list.

14. The system of claim 13, wherein the instructions further cause the system to
generate a delivery task,
assign the delivery vehicle to a door dock at a loading facility based on the delivery task, and
transport the mobile cart from the delivery vehicle to the cart loading zone associated with the door dock using the second AGV, the cart loading zone being determined based on the assignment of the door dock.

15. The system of claim 14, wherein the instructions further cause the system to
receive a notification message indicating arrival of the delivery vehicle at the door dock,
transmit an instruction to release a cart lock, the cart lock configured to secure the mobile cart to the delivery vehicle,
couple the second AGV with the mobile cart, and
transport the mobile cart from the delivery vehicle to the cart loading zone using the second AGV.

16. The system of claim 13, wherein transporting, by the first AGV, the item from the item loading area to the point proximate to the assigned location on the mobile cart includes
navigating the first AGV to the item loading area,
retrieving the item from the item loading area by the first AGV,
determining the point proximate to the assigned location on the mobile cart based on a location of the mobile cart, the assigned location, and a range of motion of an item handling mechanism of the first AGV, and
navigating the first AGV to the point proximate to the assigned location on the mobile cart in the cart loading zone.

17. The system of claim 13, wherein placing, by the first AGV, the item at the assigned location based on the task list includes articulating an item handling mechanism of the first AGV to a height matching a shelf of the mobile cart at which the assigned location is located, and transferring the item from the item handling mechanism to the shelf at the assigned location.

18. The system of claim 13, wherein transporting, by the second AGV, the mobile cart from the cart loading zone into the delivery vehicle based on the task list includes
navigating the second AGV to the cart loading zone,
coupling the second AGV with the mobile cart in the cart loading zone, and
navigating the second AGV with the mobile cart using a guidance system of the second AGV including applying motive force to the mobile cart by the second AGV to transport the mobile cart into the delivery vehicle.

19. The system of claim 13, further comprising responsive to determining that the mobile cart has arrived at the securable position in the delivery vehicle, securing the mobile cart to the delivery vehicle by actuating a cart lock adapted to secure the mobile cart to the delivery vehicle.

20. The system of claim 13, wherein the first AGV includes a first drive unit that provides motive force to the first AGV, a first guidance system that locates the first AGV in an operating environment, and an item handling mechanism adapted to move items.

21. The system of claim 20, wherein the second AGV includes a second drive unit that provides motive force to the second AGV, a second guidance system that locates the second AGV in the operating environment, and a cart coupling mechanism that couples the second AGV with the mobile cart.

22. The system of claim 13, wherein the instructions further cause the system to
capture a label of the item using a scanner communicatively coupled with the computing system,
determine a delivery destination based on the captured label on the item, and
assign the item to the location on the mobile cart based on the delivery destination of the item.

23. The system of claim 13, wherein the instructions further cause the system to
assign the item to a door dock associated with the delivery vehicle based on a delivery destination of the item, and
instruct a conveyor mechanism to transport the item to the door dock associated with the delivery vehicle.

24. The system of claim 13, wherein assigning the item to the location on the mobile cart includes
determining one or more measurements of the item,
determining one or more measurements of available storage locations on the mobile cart,
determining a position of a delivery of the item in a sequence of deliveries of a set of items assigned to the delivery vehicle, and
determining the assigned location of the item based on the one or more measurements of the item, the one or more measurements of the available storage locations on the mobile cart, and the position of the delivery of the item in the sequence of deliveries.

25. One or more automated guided vehicles ("AGVs") comprising:
a body;
a drive unit coupled with the body and providing motive force to the body;
a guidance system coupled with a controller, the guidance system locating the one or more AGVs in an operating environment;
an item handling mechanism coupled with the body and the controller, the item handling mechanism adapted to move an item; and
the controller coupled with the drive unit, the guidance system, and the item handling mechanism, the controller performing operations including:
receiving an instruction from a computing system, the instruction identifying a location on a mobile cart in a cart loading zone, the location being assigned to the item;
transporting, by the one or more AGVs, the item from an item loading area to a point proximate to the assigned location on the mobile cart, transporting including navigating using the drive unit and the guidance system;
placing the item at the assigned location using the item handling mechanism of the one or more AGVs; and
transporting, by the one or more AGVs, the mobile cart from the cart loading zone into a delivery vehicle based on the item being placed at the assigned location, the one or more AGVs being adapted to move multiple mobile carts into the delivery vehicle, each of the mobile carts having multiple shelves adapted to hold items, the delivery vehicle being adapted to simultaneously hold the multiple mobile carts.

* * * * *